(12) United States Patent
Hoshi

(10) Patent No.: US 9,091,815 B2
(45) Date of Patent: Jul. 28, 2015

(54) RETARDATION ELEMENT AND DISPLAY

(75) Inventor: Mitsunari Hoshi, Tokyo (JP)

(73) Assignee: Sony Corporation, Tokyo (JP)

( * ) Notice: Subject to any disclaimer, the term of this patent is extended or adjusted under 35 U.S.C. 154(b) by 1285 days.

(21) Appl. No.: 12/638,469

(22) Filed: Dec. 15, 2009

(65) Prior Publication Data

US 2010/0149472 A1    Jun. 17, 2010

(30) Foreign Application Priority Data

Dec. 15, 2008    (JP) ................ P2008-318301

(51) Int. Cl.
| | | |
|---|---|---|
| *G02F 1/1335* | (2006.01) | |
| *G02B 27/22* | (2006.01) | |
| *G02B 5/30* | (2006.01) | |
| *G02B 27/26* | (2006.01) | |
| *H04N 13/04* | (2006.01) | |

(52) U.S. Cl.
CPC .............. *G02B 5/3083* (2013.01); *G02B 27/26* (2013.01); *H04N 13/0434* (2013.01)

(58) Field of Classification Search
USPC ............................................ 349/15, 117–121
See application file for complete search history.

(56) References Cited

U.S. PATENT DOCUMENTS

| | | | | |
|---|---|---|---|---|
| 5,402,191 | A * | 3/1995 | Dean et al. ................... | 352/63 |
| 5,686,975 | A * | 11/1997 | Lipton ............................ | 349/15 |
| 6,046,787 | A | 4/2000 | Nishiguchi | |
| 6,188,451 | B1 * | 2/2001 | Fujii et al. ..................... | 349/15 |
| 2005/0168816 | A1 * | 8/2005 | Fukaishi et al. .............. | 359/465 |
| 2006/0232734 | A1 * | 10/2006 | Schadt et al. ................. | 349/117 |
| 2006/0250550 | A1 * | 11/2006 | Tanaka et al. ................. | 349/114 |
| 2006/0285026 | A1 | 12/2006 | Robinson | |
| 2009/0244412 | A1 | 10/2009 | Tsukagoshi | |

FOREIGN PATENT DOCUMENTS

| | | |
|---|---|---|
| EP | 0 887 667 | 12/1998 |
| GB | 2331812 | 6/1999 |
| JP | 3360787 | 6/1998 |
| JP | 10-232365 | 9/1998 |
| WO | 2008/081919 | 7/2008 |

OTHER PUBLICATIONS

European Search Report for corresponding EP 09 01 5265 issued on Feb. 3, 2010.

(Continued)

*Primary Examiner* — Hoan C Nguyen
(74) *Attorney, Agent, or Firm* — K&L Gates LLP

(57) ABSTRACT

A retardation element allowing a reduction in ghosts caused by optical anisotropy of a base film, and a display including the retardation element are provided. A retardation element includes: a base film having optical anisotropy; and a retardation layer formed on the base film and having optical anisotropy, in which the retardation layer includes retardation regions of two or more kinds of which slow axes are oriented in different directions from one another, the retardation regions of two or more kinds are arranged regularly adjacent to one another in an in-plane direction of the base film, and each of the retardation regions has a slow axis in a direction intersecting with a slow axis of the base film at an angle larger than 45°.

10 Claims, 20 Drawing Sheets

(56) References Cited

OTHER PUBLICATIONS

Japanese Office Action issued Jul. 23, 2013 in corresponding Japanese Patent Application No. 2009-280753.

European Office Action issued Apr. 7, 2015 in corresponding European Application No. 09015265.3.

* cited by examiner

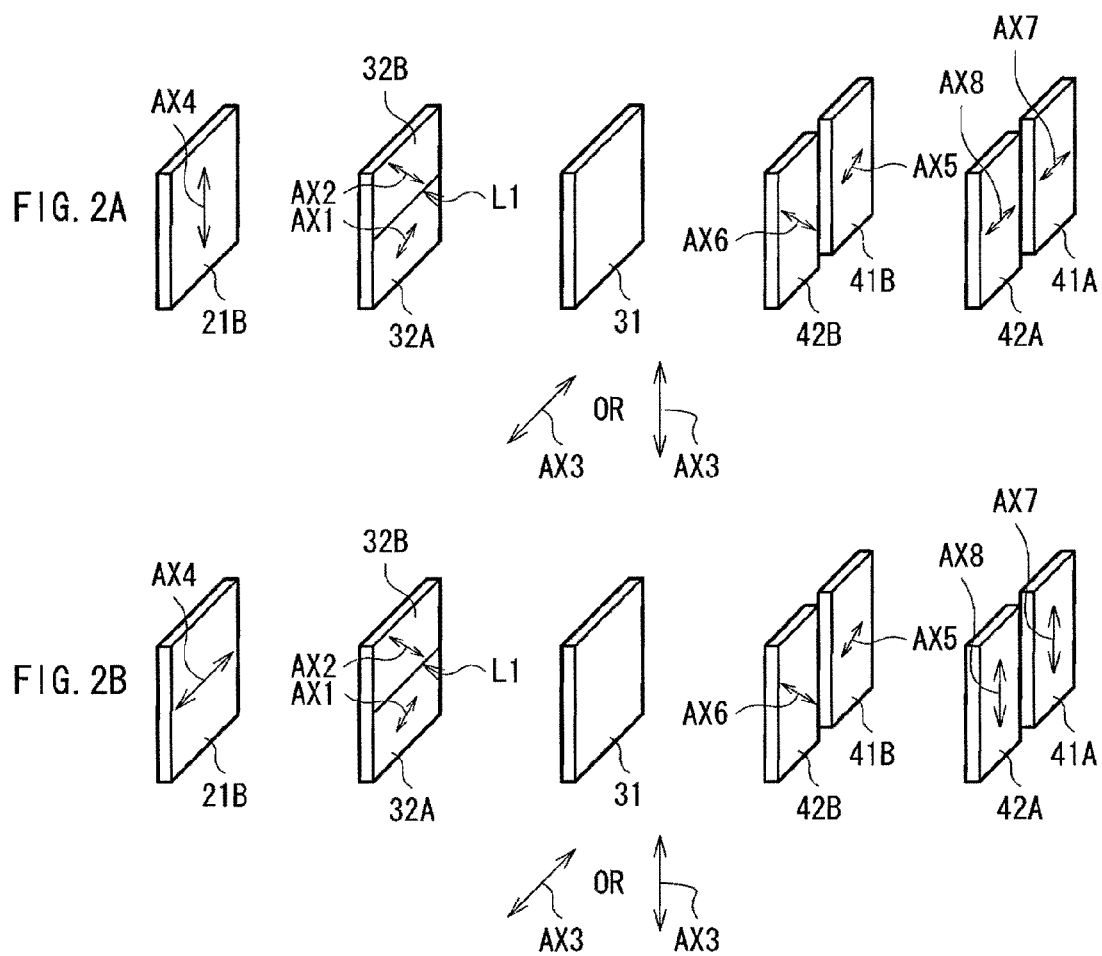

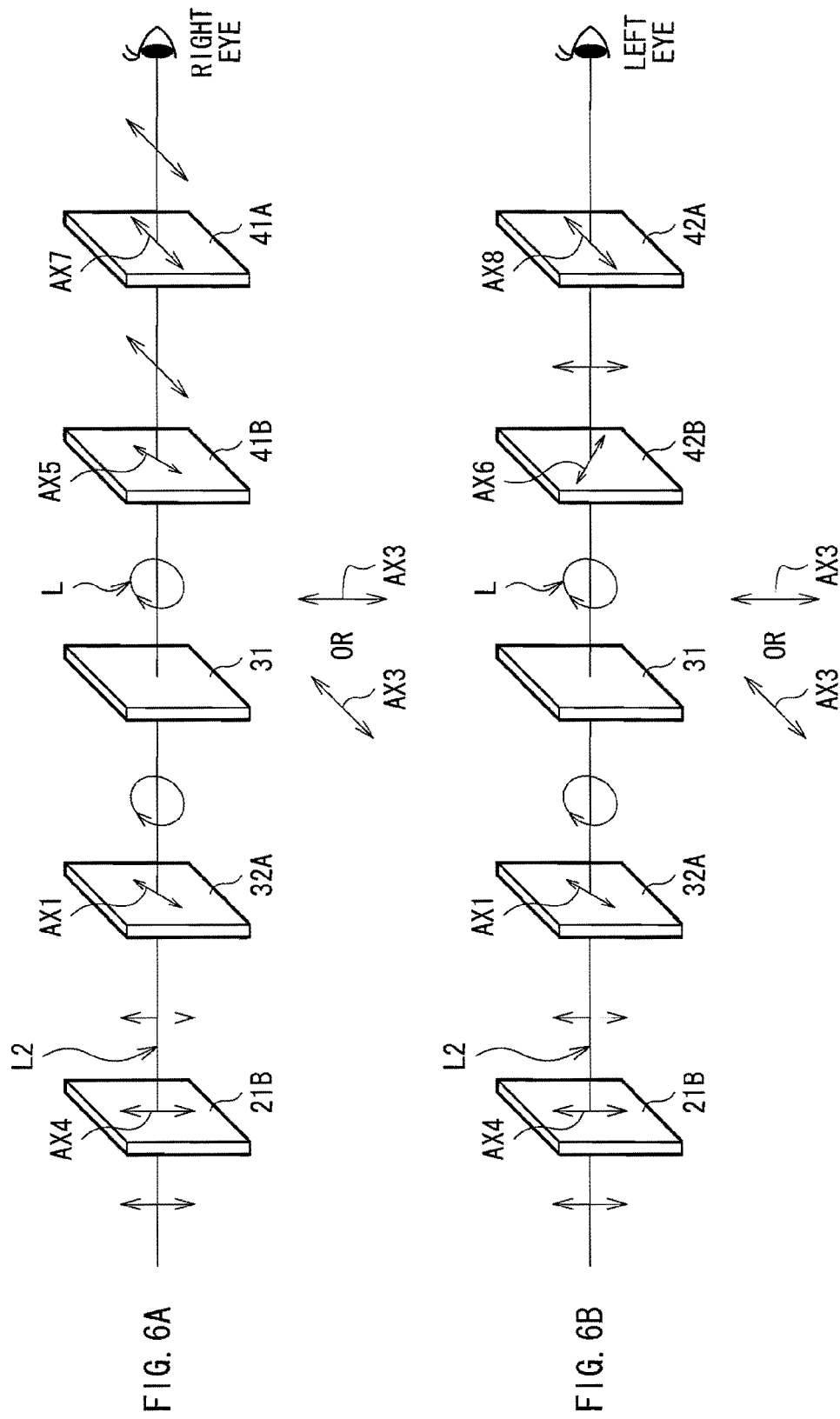

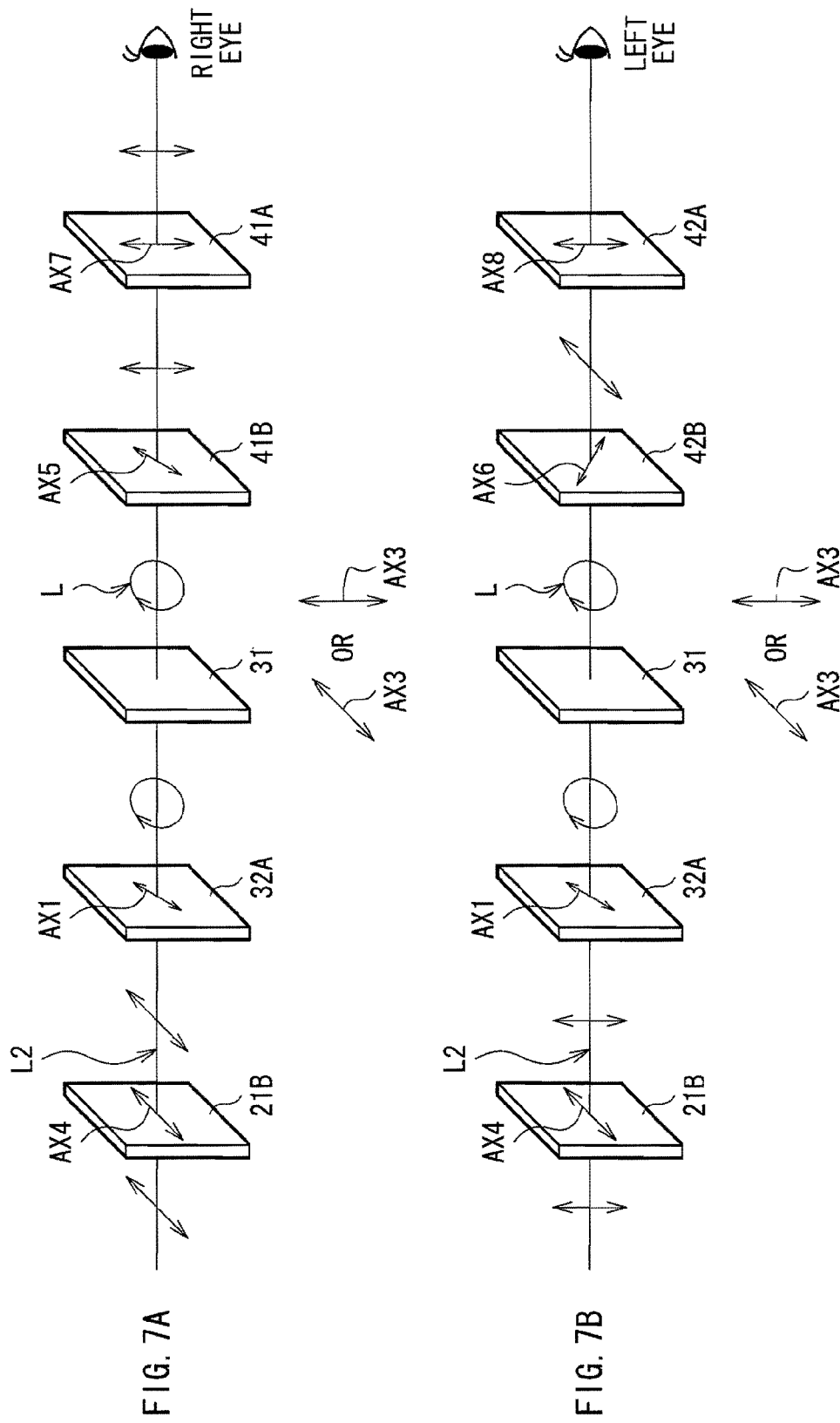

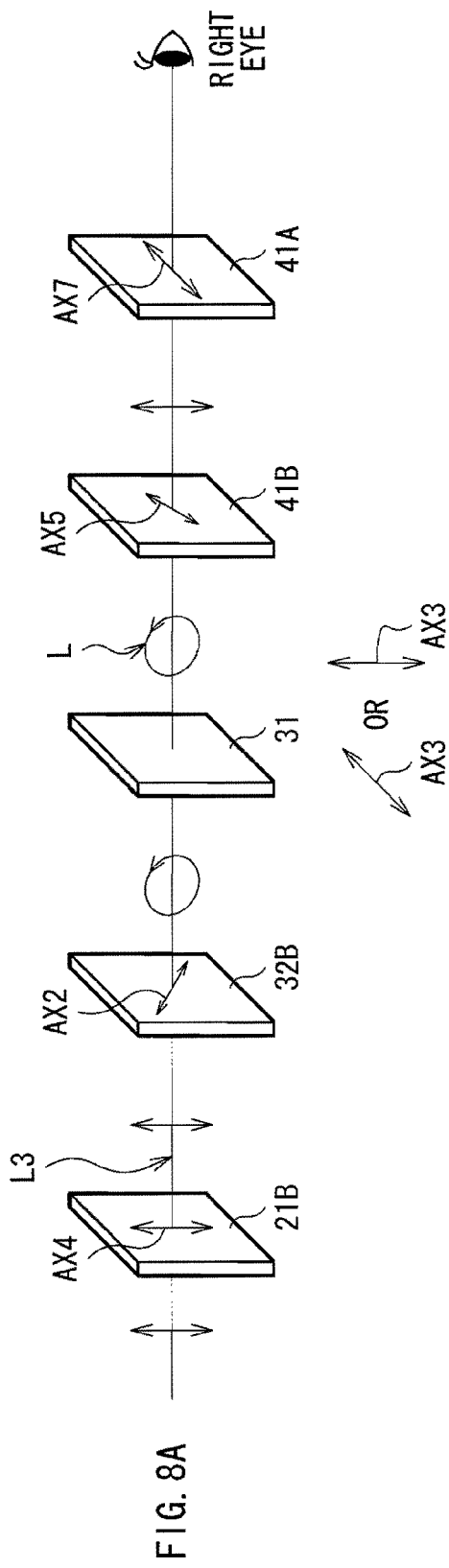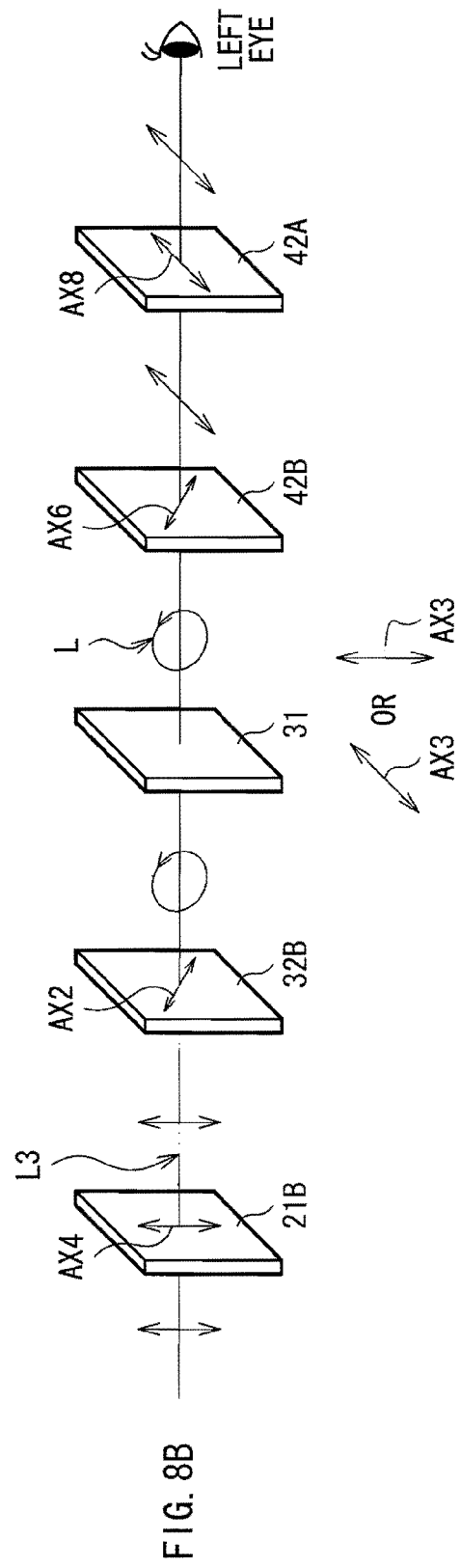

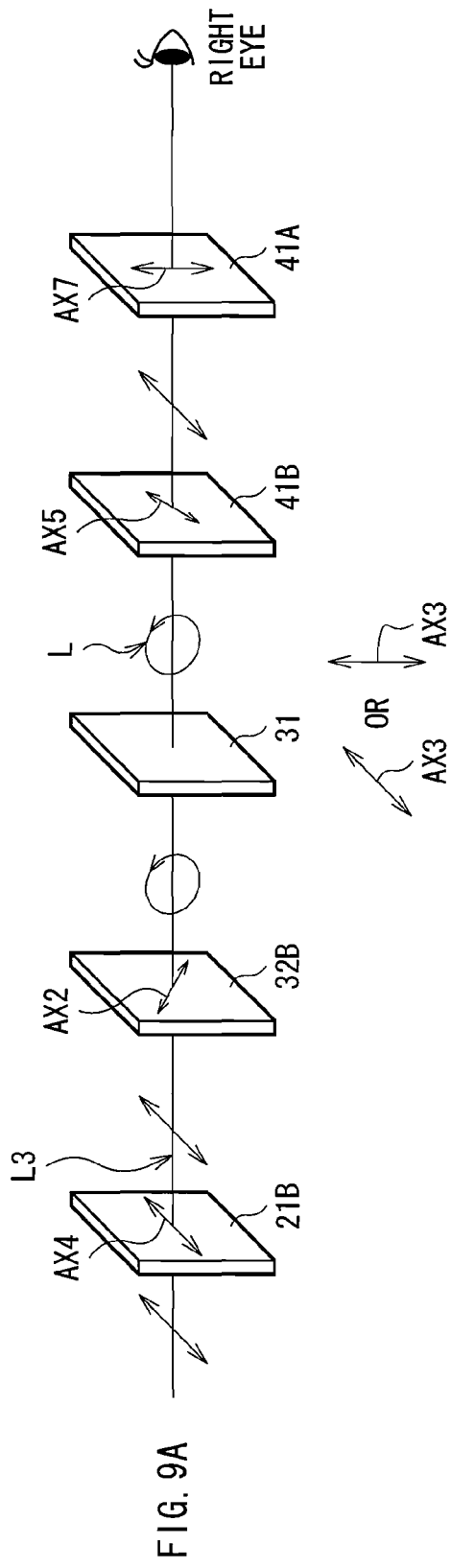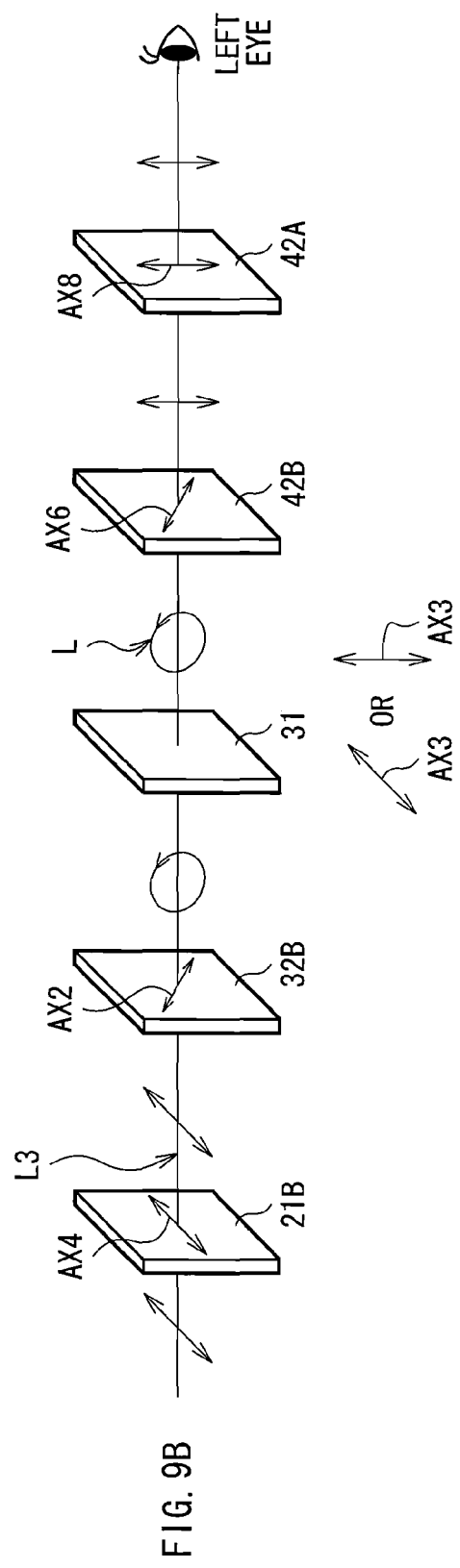

RETARDATION ELEMENT AND DISPLAY

CROSS REFERENCES TO RELATED APPLICATIONS

The present application claims priority to Japanese Priority Patent Application JP 2008-318301 filed in the Japan Patent Office on Dec. 15, 2008, the entire content of which is hereby incorporated by references.

BACKGROUND

The present application relates to a retardation element having optical anisotropy and a display including the retardation element, more specifically to a retardation element suitably used for viewing a stereoscopic picture through the use of a pair of polarized glasses and a display including the retardation element.

Stereoscopic picture displays using a pair of polarized glasses in related art include a display in which a right-eye pixel and a left-eye pixel emit light in different polarization states, respectively. In such a display, a viewer wears a pair of polarized glasses, and light emitted from the right-eye pixel enters only the right eye of the viewer, and light emitted from the left-eye pixel enters only the left eye of the viewer, thereby a stereoscopic picture is viewable.

For example, in Japanese Patent No. 3360787, a retardation element is used in order for a right-eye pixel and a left-eye pixel to emit light in different polarization states, respectively. In the retardation element, a belt-shaped retardation member having a slow axis or a fast axis in one direction is arranged corresponding to a left-eye pixel, and a belt-shaped retardation member having a slow axis or a fast axis in a direction different from the direction of the slow axis or the fast axis of the above-described belt-shaped retardation member is arranged corresponding to a right-eye pixel.

SUMMARY

In the above-described display, it is desirable that left-eye picture light emitted from the left-eye pixel enters only the left eye of a viewer, and right-eye picture light emitted from the right-eye pixel enters only the right eye of the viewer. However, there is such an issue called ghosts that the left-eye picture slightly enters the right eye or the right-eye picture light slightly enters the left eye.

In particular, in the display described in Japanese Patent No. 3360787, in the case where a base is configured of a plastic film, a slight optical anisotropy which is present in the base causes severe ghosts.

It is desirable to provide a retardation element allowing a reduction in ghosts caused by optical anisotropy of a base film, and a display including the retardation element.

According to an embodiment, there is provided a retardation element including: a base film having optical anisotropy; and a retardation layer formed on the base film and having optical anisotropy. The retardation layer includes retardation regions of two or more kinds of which slow axes are oriented in different directions from one another, and the retardation regions of two or more kinds are arranged regularly adjacent to one another in an in-plane direction of the base film. Each of the retardation regions has a slow axis in a direction intersecting with a slow axis of the base film at an angle larger than 45°.

According to an embodiment, there is provided a display including: a display panel being driven in response to an image signal; a backlight unit applying light to the display panel; and a retardation element arranged on a side opposite to a side where the backlight unit is arranged of the display panel. The retardation element included in the display includes the same components as those in the above-described retardation element.

In the retardation element and the display according to an embodiment, the retardation regions of two or more kinds of which slow axes are oriented in different directions from one another are arranged regularly adjacent to one another in the in-plane direction of the base film. Thereby, for example, light incident from a side closer to the retardation regions are divided into two or more kinds of light of which polarization states are different from one another, and then the two or more kinds of light pass through the base film. In this case, each of the retardation regions has a slow axis in a direction intersecting with the slow axis of the base film at an angle larger than 45°. Thus, when an offset is provided to the direction of the slow axis of each of the retardation regions, a change in polarization state caused by optical anisotropy of the base film is prevented.

In the retardation element and the display according to an embodiment of the invention, an offset is provided to the direction of the slow axis of each of the retardation regions so as to prevent a change in polarization state caused by optical anisotropy of the base film, so a reduction in ghosts caused by the optical anisotropy of the base film is allowed.

Additional features and advantages are described herein, and will be apparent from the following Detailed Description and the figures.

BRIEF DESCRIPTION OF THE FIGURES

FIGS. 2A and 2B are conceptual diagrams for describing transmission axes and slow axes in the display in FIG. 1.

FIGS. 6A and 6B are conceptual diagrams for describing an example of transmission axes and slow axes when a picture on the display in FIG. 1 is viewed by the right eye of a viewer.

FIGS. 7A and 7B are conceptual diagrams for describing another example of the transmission axes and the slow axes when a picture on the display in FIG. 1 is viewed by the right eye of the viewer.

FIGS. 8A and 8B are conceptual diagrams for describing an example of transmission axes and slow axes when a picture on the display in FIG. 1 is viewed by the left eye of the viewer.

FIGS. 9A and 9B are conceptual diagrams for describing another example of the transmission axes and the slow axes when a picture on the display in FIG. 1 is viewed by the left eye of the viewer.

DETAILED DESCRIPTION

The present application will be described in detail below referring to the accompanying drawings according to an embodiment. Descriptions will be given in the following order.

1. Embodiment (display, retardation element)
2. Modifications (display, retardation element)
3. Examples (display)

Figure 1:
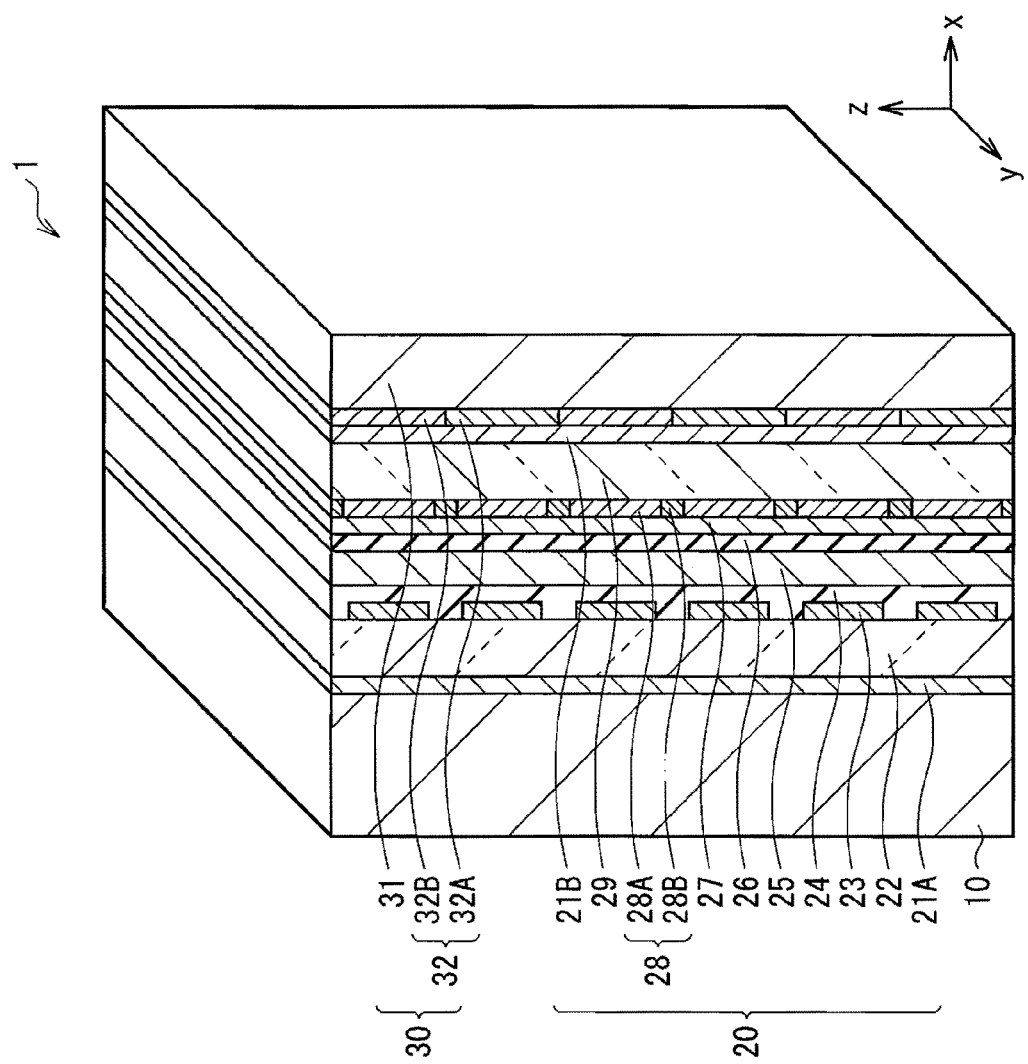
FIG. 1 is a sectional view illustrating an example of a configuration of a display according to an embodiment.

FIG. 1 illustrates a sectional configuration of a display according to an embodiment. In addition, a retardation element according to an embodiment will be described referring to the case where the retardation element is included in the display according to an embodiment.

Configuration of Display 1

The display 1 is a polarized-glasses type display displaying a stereoscopic picture for a viewer (not illustrated) wearing a pair of polarized glasses 2 which will be described later in front of his eyeballs. The display 1 has a configuration in which a backlight unit 10, a liquid crystal display panel 20 (a display panel) and a retardation element 30 are laminated in this order. In the display 1, a surface of the retardation element 30 is a picture display surface which faces the viewer.

In addition, in the embodiment, the display 1 is arranged so that the picture display surface is parallel to a perpendicular plane (a vertical plane). The picture display surface has a rectangular shape, and the longer direction of the picture display surface is parallel to a horizontal direction (a y-axis direction in the drawing). The viewer wearing the pair of polarized glasses 2 in front of his eyeballs views the picture display surface. The pair of polarized glasses 2 are of a circular polarization type, and the display 1 is a display for a pair of circularly polarized glasses.

Backlight Unit 10

The backlight unit 10 includes, for example, a reflection plate, a light source and an optical sheet (all not illustrated). The reflection plate allows light emitted from the light source to return to the optical sheet side, and has functions such as reflection, scattering and diffusion. The reflection plate is made of, for example, foamed PET (polyethylene terephthalate) or the like. Thereby, the light emitted from the light source is effectively usable. The light source emits light from behind the liquid crystal display panel 20, and includes, for example, a plurality of linear light sources which are arranged in parallel at regular intervals or a plurality of point light sources which are two-dimensionally arranged. In addition, examples of the linear light source include a hot cathode fluorescent lamp (HCFL), a cold cathode fluorescent lamp (CCFL) and the like. Moreover, examples of the point light source include a light emitting diode (LED) and the like. The optical sheet makes an in-plane luminance distribution of the light from the light source uniform, or adjusts the divergence angle or the polarization state of the light from the light source in a desired range, and includes, for example, a diffusion plate, a diffusion sheet, a prism sheet, a reflective polarizing element, a retardation film or the like. Moreover, the light source may be of an edge light type, and in this case, if necessary, a light guide plate or a light guide film is used.

Liquid Crystal Display Panel 20

The liquid crystal display panel 20 is a transmissive display panel in which a plurality of pixels are two-dimensionally arranged in a row direction and a column direction, and drives each of the pixels in response to a picture signal to display an image. For example, as illustrated in FIG. 1, the liquid crystal display panel 20 includes a polarizing plate 21A, a transparent substrate 22, a pixel electrode 23, an alignment film 24, a liquid crystal layer 25, an alignment film 26, a common electrode 27, a color filter 28 a transparent electrode 29 and a polarizing plate 21B in order from a side closer to the backlight unit 1.

In this case, the polarizing plate 21A is a polarizing plate (a polarizing element) arranged on a light incident side of the liquid crystal display panel 20, and the polarizing plate 21B is a polarizing plate (a polarizing element) arranged on a light emission side of the liquid crystal display panel 20. The polarizing plates 21A and 21B each are a kind of an optical shutter, and allow only light (polarized light) in a certain vibration direction to pass therethrough. For example, the polarizing plates 21A and 21B are arranged so that their polarizing axes are different by a predetermined angle (for example, 90°) from each other, thereby light emitted from the backlight unit 1 passes through the polarizing plates 21A and 21B via the liquid crystal layer or is blocked by the polarizing plates 21A and 21B.

The direction of the transmission axis (not illustrated) of the polarizing plate 21A is set within a range in which the light emitted from the backlight unit 1 is allowed to pass through. For example, in the case where the polarizing axis of the light emitted from the backlight unit 1 is oriented in a vertical direction, a transmission axis is also oriented in the vertical direction, and in the case where the polarizing axis of the light emitted from the backlight unit 1 is oriented in a horizontal direction, the transmission axis is also oriented in the horizontal direction. In addition, the light emitted from the backlight unit 1 is not limited to linearly polarized light, and may be circularly polarized light, elliptically polarized light or non-polarized light.

The direction of the polarizing axis AX4 of the polarizing plate 21B (refer to FIGS. 2A and 2B) is set within a range in which light having passed through the liquid crystal display panel 20 is allowed to pass through. For example, in the case where the polarizing axis (not illustrated, in this specification, "polarizing axis" and "transmission axis" are synonymous with each other) of the polarizing plate 21A is oriented in the horizontal direction, the polarizing axis AX4 is oriented in a direction orthogonal to the polarizing axis of the polarizing plate 21A (in the vertical direction), and in the case where the polarizing axis of the polarizing plate 21A is oriented in the vertical direction, the polarizing axis AX4 is oriented in a direction orthogonal to the polarizing axis of the polarizing plate 21A (in the horizontal direction). In addition, in this specification, "polarizing axis" and "transmission axis" are synonymous with each other.

The transparent substrates 22 and 29 are typically substrates transparent to visible light. In addition, in the transparent substrate on a side closer to the backlight unit 1, for example, an active drive circuit including a TFT (thin film transistor) as a drive element electrically connected to a transparent pixel electrode, wiring and the like are formed. The pixel electrode 23 is made of, for example, indium tin oxide (ITO), and functions as an electrode for each pixel. The alignment film 24 is made of, for example, a polymeric material such as polyimide, and performs an alignment process on liquid crystal molecules. The liquid crystal layer 25 is made of, for example, a VA (Vertical Alignment) mode, a TN (Twisted Nematic) mode or a STN (Super Twisted Nematic) mode liquid crystal. The liquid crystal layer 25 has a function of allowing the light emitted from the backlight unit 1 to pass through each pixel or be blocked by each pixel. The common electrode 27 is made of, for example, ITO, and functions as a common opposed electrode. The color filter 28 is formed by arranging filter sections 28A for dividing the light emitted from the backlight unit 1 into, for example, three primary colors, that is, red (R), green (G) and blue (B). In the color filter 28, a black matrix section 28B is arranged in a part corresponding to a boundary between pixels.

Retardation Element 30

Figures 3A, 3B:
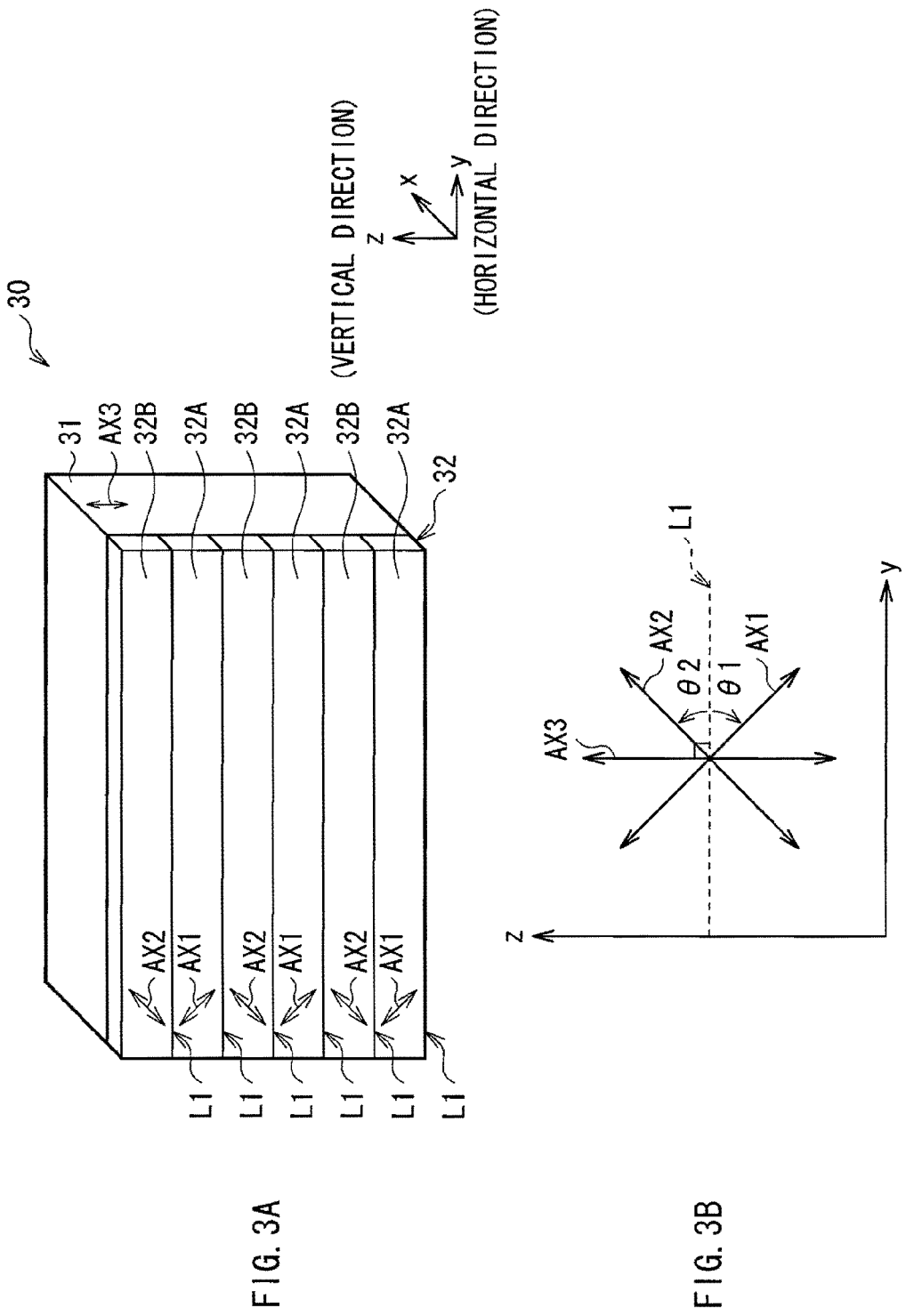
FIGS. 3A and 3B are configuration diagrams illustrating an example of a retardation element in FIG. 1 and slow axes.
Figures 4A, 4B:
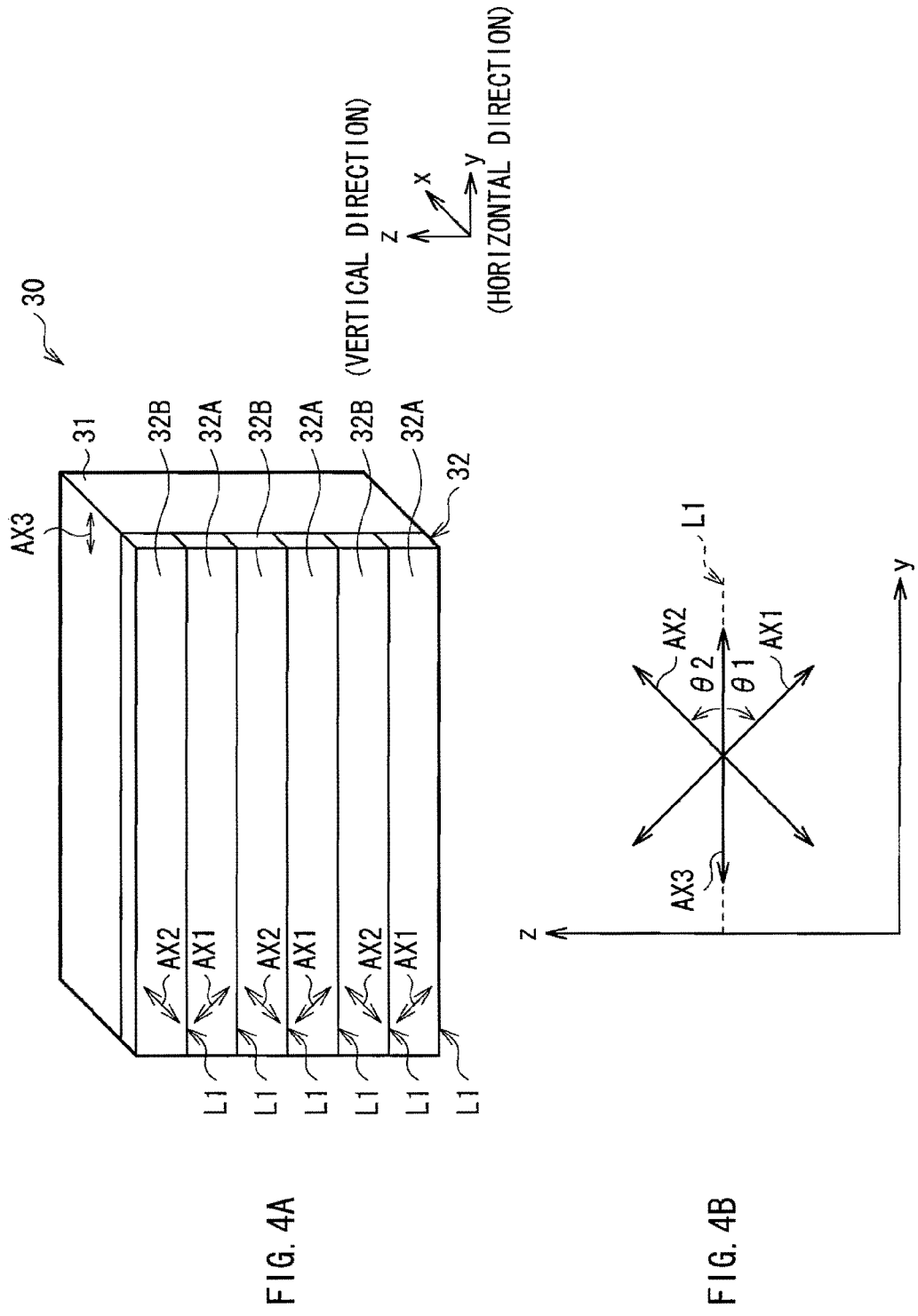
FIGS. 4A and 4B are configuration diagrams illustrating another example of the retardation element in FIG. 1 and the slow axes.

Next, the retardation element 30 will be described below. FIG. 3A is a perspective view of an example of a configuration of the retardation element 30 according to the embodiment. FIG. 3B illustrates slow axes of the retardation element 30 in FIG. 3A. FIG. 4A is a perspective view of another example of the configuration of the retardation element 30 according to the embodiment. FIG. 4B illustrates the slow axes of the retardation element 30 in FIG. 4A. In addition, there is a difference in the direction of a slow axis AX3 of a base film 31 (which will be described later) between the retardation element 30 illustrated in FIGS. 3A and 3B and the retardation element 30 illustrated in FIGS. 4A and 4B.

The retardation element 30 changes the polarization state of light having passed through the polarizing plate 21B of the liquid crystal display panel 20. For example, as illustrated in FIG. 1, the retardation element 30 includes the base film 31 and a retardation layer 32.

The base film 31 is configured of a thin resin film having optical anisotropy. As the resin film, a resin film having small optical anisotropy, that is, small birefringence is preferable. Examples of a resin film having such characteristics and frequently used for commercial use include TAC (triacetylcellulose), COP (cycloolefin polymer), PMMA (polymethylmethacrylate) and the like. In this case, examples of COP include Zeonor (a registered trademark of Zeon Corporation), ARTON (a registered trademark of JSR Corporation) and the like. For example, the thickness of the base film 31 is preferably within a range from 30 µm to 500 µm both inclusive. The retardation of the base film 31 is preferably 20 nm or less, and more preferably 10 nm or less. In addition, the retardation is measurable by, for example, some elliptical polarization analyses such as a rotating analyzer method or a Senarmont method. In the description, as a retardation value, a value obtained by the rotating analyzer method is shown.

The slow axis AX3 of the base film 31 is oriented in the horizontal direction or the vertical direction as illustrated in FIGS. 3A and 3B and FIGS. 4A and 4B. More specifically, it is clear from descriptions about the retardation layer 32 which will be described later that the slow axis AX3 is oriented in a direction which is the same as a longer direction or a shorter direction of a right-eye region 32A and a left-eye region 32B, and is the same as or orthogonal to the direction of a boundary line L1. Moreover, the slow axis AX3 is preferably oriented in a direction which intersects with slow axes AX1 and AX2 and is parallel to a bisector in the vertical or horizontal direction of the slow axes AX1 and AX2.

The retardation layer 32 is a thin layer having optical anisotropy. The retardation layer 32 is arranged on a surface of the base film 31, and is bonded to a surface (the polarizing plate 21B) on a light emission side of the liquid crystal display panel 20 with an adhesive (not illustrated) or the like (refer to FIG. 1). The retardation layer 32 includes retardation regions of two kinds (right-eye regions 32A and left-eye regions 32B) of which the slow axes are oriented in different directions from each other. In addition, the right-eye regions 32A in the embodiment corresponds to a specific example of "retardation regions of one kind" in the invention, and the left-eye regions 32B in the embodiment corresponds to a specific example of "retardation regions of other kinds" in the invention.

For example, as illustrated in FIGS. 1, 3A and 4A, the right-eye regions 32A and the left-eye regions 32B each have a strip shape extending in one common direction (in the horizontal direction). The right-eye regions 32A and the left-eye regions 32B are arranged regularly adjacent to each other in an in-plane direction of the base film 31, and more specifically, the right-eye regions 32A and the left-eye regions 32B are alternately arranged in the shorter direction of the right-eye regions 32A and the left-eye regions 32B (in the vertical direction). Therefore, the boundary line L1 between the right-eye regions 32A and the left-eye regions 32B is oriented in the same direction as the longer direction of the right-eye regions 32A and the left-eye regions 32B (in the horizontal direction).

As illustrated in FIGS. 3A and 3B and FIGS. 4A and 4B, the right-eye regions 32A each have the slow axis AX1 in a direction intersecting with the boundary line L1 at an angle θ(0°<θ1<90°) except for an angle orthogonal to the boundary line L1. On the other hand, as illustrated in FIGS. 3A and 3B and FIGS. 4A and 4B, the left-eye regions 32B each have the slow axis AX2 in a direction which intersects with the boundary line L1 at an angle θ2 (0°<θ2<90°) except for an angle orthogonal to the boundary line L1 and different from the direction of the slow axis AX1.

In this case, "a direction different from the direction of the slow axis AX1" means not only a direction simply different from the direction of the slow axis AX1 but also a direction rotated in a direction opposite to the slow axis AX1. In other words, the slow axes AX1 and AX2 are rotated about the boundary line L1 in different directions from each other. The angle θ1 of the slow axis AX1 and the angle θ2 of the slow axis AX2 are preferably equal to each other as absolute values (in the case where the rotating direction is not considered). However, the angles θ1 and θ2 may be slightly different from each other due to a manufacturing error (manufacturing variations), and in some cases, the angles θ1 and θ2 may be different from each other by a larger angle than the manufacturing error. In addition, although the above-described manufacturing error depends on a technique of manufacturing the right-eye regions 32A and the left-eye regions 32B, the manufacturing error is, for example, approximately 1° to 2° at a maximum.

As illustrated in FIGS. 2A and 2B to 4A and 4B, the slow axes AX1 and AX2 are oriented in a direction which intersects with both of the horizontal direction and the vertical direction, and also intersects with the slow axis AX3 of the base film 31. Moreover, the slow axes AX1 and AX2 are preferably oriented in such a direction that the bisector in the vertical or horizontal direction of the slow axes AX1 and AX2 is oriented in a direction parallel to the boundary line L1.

As illustrated in FIGS. 2A and 2B, the slow axes AX1 and AX2 are oriented in a direction intersecting with the polarizing axis AX4 of the polarizing plate 21B in the liquid crystal display panel 20. Moreover, the slow axis AX1 is oriented in a direction which is the same as or corresponds to the direction of a slow axis AX5 of a right-eye retardation film 41B in the pair of polarized glasses 2 which will be described later, and is different from the direction of a slow axis AX6 of a left-eye retardation film 42B. On the other hand, the slow axis AX2 is oriented in a direction which is the same as or corresponds to the direction of the slow axis AX6, and is different from the direction of the slow axis AX5.

Pair of Polarized Glasses 2

Figure 5:
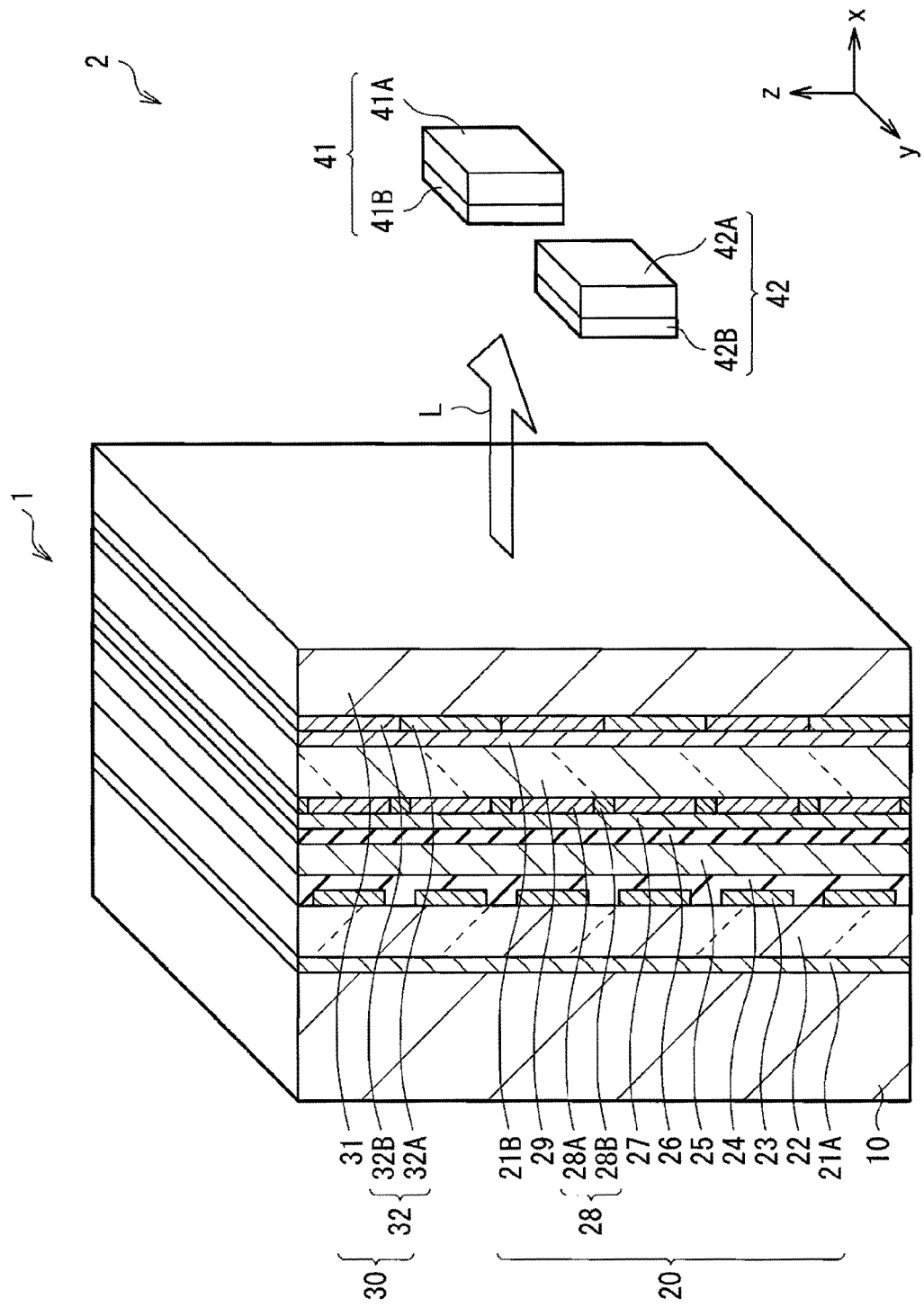
FIG. 5 is a system chart illustrating a relationship between the display in FIG. 1 and a pair of polarized glasses.

Next, the pair of polarized glasses 2 will be described below. FIG. 5 is a perspective view of an example of a configuration of the pair of polarized glasses 2 with the display 1. The pair of polarized glasses 2 are worn in front of the eyeballs of a viewer (not illustrated), and are used by the viewer when the viewer views a picture displayed on the picture display surface. For example, as illustrated in FIG. 5, the pair of polarized glasses 2 include a right-eye lens 41 and a left-eye lens 42.

The right-eye lens 41 and the left-eye lens 42 are arranged so as to face the picture image surface of the display 1. In addition, as illustrated in FIG. 5, although the right-eye lens 41 and the left-eye lens 42 are preferably arranged in one horizontal plane, the right-eye lens 41 and the left-eye lens 42 may be arranged in a slightly inclined flat plane.

The right-eye lens 41 includes, for example, a polarizing plate 41A and the right-eye retardation film 41B. On the other hand, the left-eye lens 42 includes, for example, a polarizing plate 42A and the left-eye retardation film 42B. The right-eye retardation film 41B is arranged on a surface of the polarizing plate 41A on a side where light L emitted from the display 1 enters. The left-eye retardation film 42B is arranged on a surface of the polarizing plate 42A on a side where the light L enters.

The polarizing plates 41A and 42A are arranged on a light emission side of the pair of polarized glasses 2, and allow only light (polarized light) in a certain vibration direction to pass therethrough. For example, in FIGS. 2A and 2B, polarizing axes AX7 and AX8 of the polarizing plates 41A and 42A are oriented in a direction orthogonal to the polarizing axis AX4 of the polarizing plate 21B. For example, as illustrated in FIGS. 2A and 2B, in the case where the polarizing axis AX4 is oriented in the vertical direction, the polarizing axes AX7 and AX8 are oriented in the horizontal direction, and in the case where the polarizing axis AX4 is oriented in the horizontal direction, the polarizing axes AX7 and AX8 are oriented in the vertical direction.

The right-eye retardation film 41B and the left-eye retardation film 42B are thin films having optical anisotropy. For example, thicknesses of these retardation films are preferably within a range from 30 μm to 200 μm both inclusive. Moreover, as the retardation films, retardation films having small optical anisotropy, that is, small birefringence are preferable. Examples of a resin film having such characteristics include COP (cycloolefin polymer), PC (polycarbonate) and the like. In this case, examples of COP include Zeonor and Zeonex (registered trademarks of Zeon Corporation), ARTON (a registered trademark of JSR Corporation) and the like. As illustrated in FIGS. 2A and 2B, the slow axis AX5 of the right-eye retardation film 41B and the slow axis AX6 of the left-eye retardation film 42B are oriented in a direction which intersects with both of the horizontal direction and the vertical direction, and also intersects with the polarizing axes AX7 and AX8 of the polarizing plates 41A and 42A. Moreover, the slow axes AX5 and AX6 are preferably oriented in such a direction that a bisector in the horizontal direction of the slow axes AX5 and AX6 is oriented in a direction orthogonal to the boundary line L1. Moreover, the slow axis AX5 is oriented in a direction which is the same as or corresponds to the direction of the slow axis AX1, and is different from the direction of the slow axis AX2. On the other hand, the slow axis AX6 is oriented in a direction which is the same as or corresponds to the direction of the slow axis AX2, and is different from the direction of the slow axis AX1.

Retardation

Referring to FIGS. 6A and 6B to 9A and 9B, retardations of the retardation element 30 and the pair of polarized glasses 2 will be described below. FIGS. 6A and 6B and FIGS. 7A and 7B are conceptual diagrams illustrating how right-eye image light L2 is recognized by the right eye and the left eye through the pair of polarized glasses 2 when focusing only on the right-eye image light L2 having entered into the right-eye region 32A of the retardation layer 32. Moreover, FIGS. 8A and 8B and FIGS. 9A and 9B are conceptual diagrams illustrating how left-eye image light L3 is recognized by the right eye and the left eye through the pair of polarized glasses 2 when focusing only on the left-eye image light L3 having entered into the right-eye region 32B of the retardation layer 32. In actuality, a mixture of the right-eye image light L2 and the left-eye image light L3 is outputted, but for convenience in description, in FIGS. 6A and 6B to FIGS. 9A and 9B, the right-eye image light L2 and the left-eye image light L3 are separately illustrated.

In the case where a picture is viewed through the use of the pair of polarized glasses 2, for example, as illustrated in FIGS. 6A, 6B, 7A and 7B, it is necessary to allow the right eye to recognize an image of right-eye pixels and not to allow the left eye to recognize the image of the right-eye pixels. Moreover, at the same time, for example, as illustrated in FIGS. 8A, 8B, 9A and 9B, it is necessary to allow the left eye to recognize an image of left-eye pixels and not to allow the right eye to recognize the image of the left-eye pixels. Therefore, the retardations of the right-eye regions 32A and the right-eye retardation film 41B and the retardations of the left-eye regions 32B and the left-eye retardation film 42B are preferably set as will be described below.

More specifically, the retardation of one of each right-eye region 32A and each left-eye region 32B is preferably +λ/4, and the retardation of the other one is preferably −λ/4. In this case, the signs of the retardations are opposite, because the signs indicate that the directions of the slow axes of the right-eye region 32A and the left-eye region 32B are different by 90° from each other. At this time, the retardation of the right-eye retardation film 41B is preferably equal to the retardation of the right-eye region 32A, and the retardation of the left-eye retardation film 42B is preferably equal to the retardation of the left-eye region 32B.

Next, a relationship between a retardation α of the base film 31, an angle θ1 of the slow axis AX1 of the right-eye region 32A and an angle θ2 of the slow axis AX2 of the left-eye region 32B will be described below. As illustrated in FIGS. 10A, 10B, 11A and 11B, when the retardation α of the base film 31 increases, the distributions of extinction ratios β1 and β2 represented by the following two formulas (1) and (2) are shifted in a direction where the angles θ1 and θ2 increase.

In this case, the extinction ratio is one of indicators quantitatively expressing the possibility of causing ghosts. Therefore, in the case where irrespective of the magnitude of the retardation α, the absolute values of the angles θ1 and θ2 are set to values corresponding to peak values of the extinction ratios β1 and β2 in the case where the retardation α is zero, for example, 45°, the extinction ratios β1 and β2 may be decreased, thereby to cause ghosts.

Extinction Ratio of Right-*EyeRegion* = 
$$\frac{\text{Luminance When Right-}EyeRegion\text{ is Viewed With Right-}EyeLens}{\text{Luminance When Right-}EyeRegion\text{ is Viewed With Left-}EyeLens}$$
Mathematical Formula 1

Extinction Ratio of Left-*EyeRegion* =
$$\frac{\text{Luminance When Left-}EyeRegion\text{ is Viewed With Left-}EyeLens}{\text{Luminance When Left-}EyeRegion\text{ is Viewed With Right-}EyeLens}$$
Mathematical Formula 2

Figure 10A:
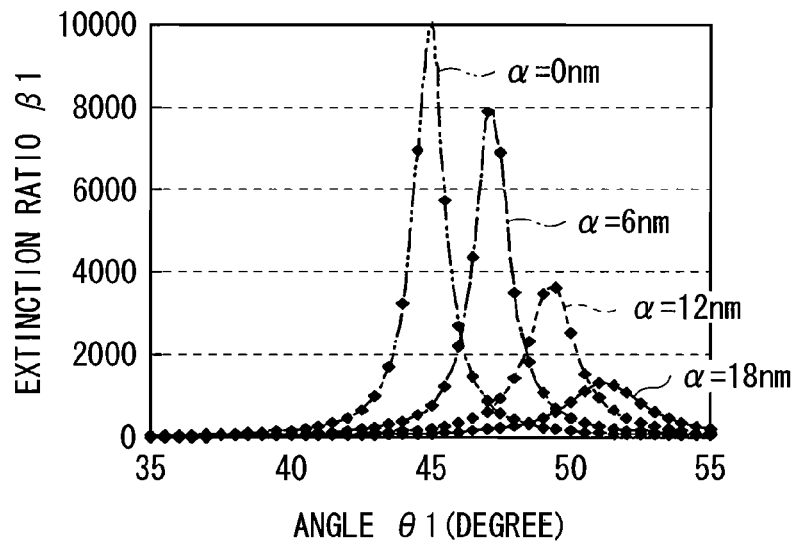
FIGS. 10A and 10B are a relationship diagram illustrating an example of a relationship between an extinction ratio distribution of the retardation element in FIG. 1 and retardation of a base film, and a relationship diagram illustrating an example of a relationship between a maximum value of an extinction ratio and retardation, respectively.
Figure 10B:
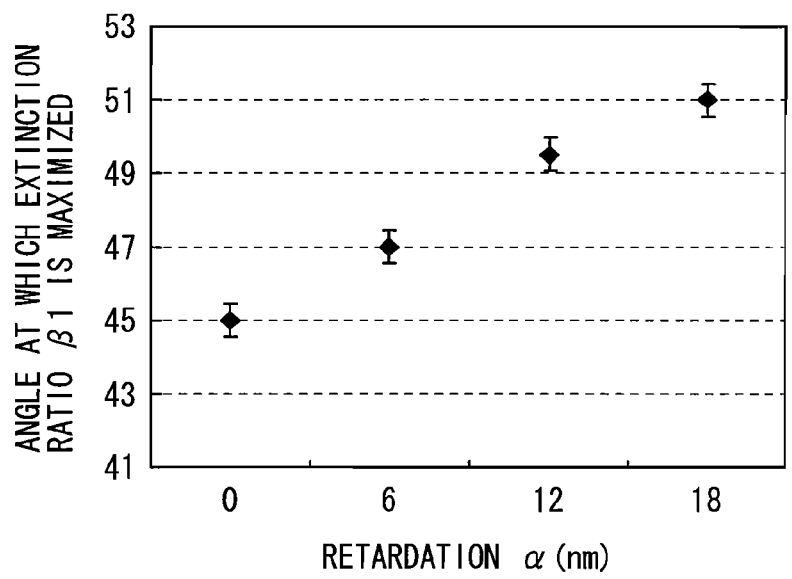
Figure 11A:
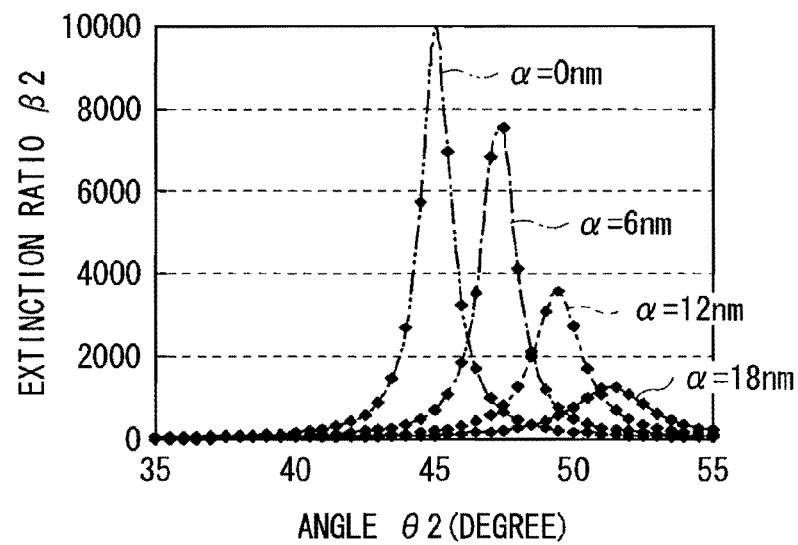
FIGS. 11A and 11B are a relationship diagram illustrating another example of the relationship between an extinction ratio distribution of the retardation element in FIG. 1 and retardation of the base film, and a relationship diagram illustrating another example of the relationship between a maximum value of an extinction ratio and retardation, respectively.
Figure 11B:
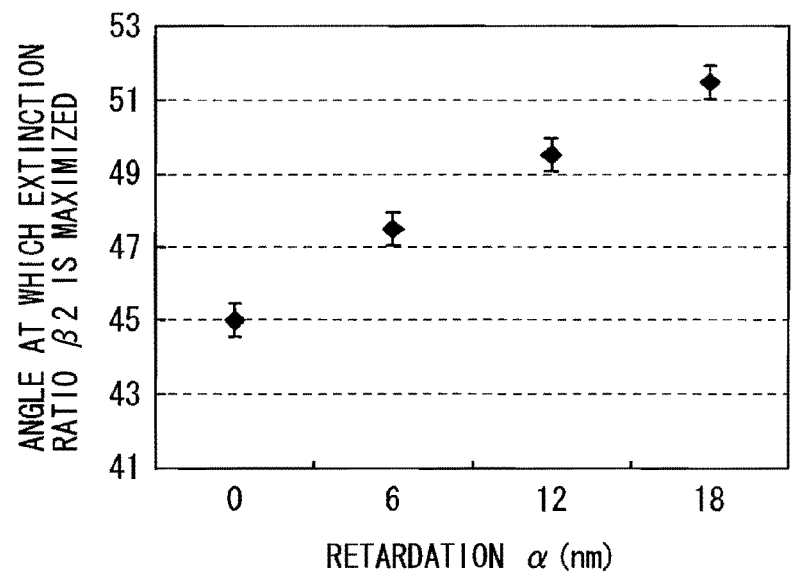

FIG. 10A illustrates a relationship between the angle θ1 and the extinction ratio β1 in the case where the retardation α is 6 nm, 12 nm and 18 nm, and FIG. 10B illustrates a relationship between the magnitude of the retardation α and the angle θ1 when the extinction ratio β1 is at maximum. FIG. 11A illustrates a relationship between the angle θ2 and the extinction ratio β2 in the case where the retardation α is 6 nm, 12 nm and 18 nm, and FIG. 11B illustrates a relationship between the magnitude of the retardation α and the angle θ2 when the extinction ratio β2 is at maximum. In addition, in FIGS. 10B and 11B, lines illustrated above and below each dot means the width of an error (an error of a maximum value) caused by the execution of a simulation.

Therefore, in an embodiment, the angles θ1 and θ2 are angles corresponding to the magnitude of the retardation α. At this time, the angles θ1 and θ2 may be angles which are the same as or different from each other. The angles θ1 and θ2 are set to, for example, such angles that both of the extinction ratios β1 and β2 are as high as possible, for example, angles corresponding to one or both of the peak values of the extinction ratios β1 and β2. In the case where the retardation α is 6 nm, the angle θ1 is, for example, 47.5°, and the angle θ2 is, for example, −47°. Moreover, in the case where the retardation α is 12 nm, the angle θ1 is, for example, 49.5°, and the angle θ2 is, for example, −49.5°. Further in the case where the retardation α is 18 nm, the angle θ1 is, for example, 51°, and the angle θ2 is, for example, −51.5°.

In addition, also in the case where the retardation α is larger than the magnitude exemplified above, the angles θ1 and θ2 may be angles corresponding to the magnitude of the retardation α. However, when the angles θ1 and θ2 are larger than 52°, the peak values of the extinction ratios are reduced to values substantially equal to the extinction ratios when the absolute values of angles θ1 and θ2 are 45° and the retardation α is 6 nm. Therefore, in this case, even if the angles θ1 and θ2 are set to any value, ghosts may be caused. Therefore, the angle θ1 is preferably larger than +45° and equal to or smaller than +52°, and the angle θ2 is preferably smaller than −45° and equal to or larger than −52°. That is, the absolute values of θ1 and/or θ2 are preferably larger than 45° and equal to or smaller than 52°.

Basic Operation

Next, an example of basic operation when displaying an image on the display 1 according to the embodiment will be described referring to FIGS. 6A and 6B to FIGS. 9A and 9B.

First, in a state in which light applied from the backlight 10 enters the liquid crystal display panel 20, a parallax signal including a right-eye image and a left-eye image as a picture signal is inputted into the liquid crystal display panel 20. Then, for example, right-eye image light L2 is outputted from pixels in odd-numbered rows (refer to FIGS. 6A and 6B or FIGS. 7A and 7B), and left-eye image light L3 is outputted from pixels in even-numbered rows (refer to FIGS. 8A and 8B or FIGS. 9A and 9B). In addition, actually a mixture of the right-eye image light L2 and the left-eye image light L3 is outputted, but for convenience in description, in FIGS. 6A and 6B to FIGS. 9A and 9B, the right-eye image light L2 and the left-eye image light L3 are separately illustrated.

After that, the right-eye image light L2 and the left-eye image light L3 are converted into elliptically polarized light by the right-eye region 32A and the left-eye region 32B in the retardation element 30, and pass through the base film 31 of the retardation element 30 to be outputted from the image display surface of the display 1 to outside. At this time, light having passed through the right-eye region 32A and light having passed through the left-eye region 32B are influenced by a slight optical anisotropy which is present in the base film 31.

After that, each light outputted to the outside of the display 1 enters into the pair of polarized glasses 2, and is converted back from elliptically polarized light to linearly polarized light by each of the right-eye retardation film 41B and the left-eye retardation film 42B, and then enters into each of the polarizing plates 41A and 42A of the pair of polarized glasses 2.

At this time, as illustrated in FIGS. 6A and 6B and FIGS. 7A and 7B, the polarizing axis of light corresponding to the right-eye image light L2 of incident light to the polarizing plates 41A and 42A is parallel to the polarizing axis AX7 of the polarizing plate 41A, and orthogonal to the polarizing axis AX8 of the polarizing plate 42A. Therefore, light corresponding to the right-eye image light L2 of the incident light to the polarizing plates 41A and 42A passes through only the polarizing plate 41A, and reaches the right eye of the viewer (refer to FIGS. 6A and 6B or the FIGS. 7A and 7B).

On the other hand, as illustrated in FIGS. 8A and 8B and FIGS. 9A and 9B, a polarizing axis of light corresponding to the left-eye image light L3 of the incident light to the polarizing plates 21A and 22A is orthogonal to the polarizing axis AX7 of the polarizing plate 21A, and parallel to the polarizing axis AX8 of the polarizing plate 22A. Therefore, the light corresponding to the left-eye image light L3 of the incident light to the polarizing plates 21A and 22A passes through only the polarizing plate 22A, and reaches the left eye of the viewer (refer to FIGS. 8A and 8B or the FIGS. 9A and 9B).

Thus, when the light corresponding to the right-eye image light L2 reaches the right eye of the viewer, and the light corresponding to the left-eye image light L3 reaches the left eye of the viewer, the viewer is allowed to recognize as if a stereoscopic image is displayed on the picture display surface of the display 1.

Effects

In an embodiment, the base film 31 of the retardation element 30 is configured of, for example, a thin resin film having optical anisotropy. Therefore, as described above, light having passed through the right-eye region 32A and light having passed through the left-eye region 32B are influenced by a slight optical anisotropy which is present in the base film 31. Therefore, ghosts may be included in the right-eye image light and the left-eye image light having reached to the eyes of the viewer.

However, in the embodiment, the absolute value of the angle θ1 of the slow axis AX1 of the right-eye region 32A and the absolute value of the angle θ2 of the slow axis AX2 of the left-eye region 32B are angles corresponding to the magnitude of retardation of the base film 31, and have an offset with respect to 45°. Thereby, a change in polarization state due to the optical anisotropy of the base film 31 is preventable. As a result, a reduction in ghosts caused by the optical anisotropy of the base film 31 is allowed.

Moreover, in an embodiment, the slow axis AX3 of the base film 31 is oriented in the horizontal direction or the vertical direction, and is oriented in a direction intersecting with the slow axes AX1 and AX2. Therefore, an influence by the optical anisotropy of the base film 31 is exerted on each light passing through the base film 31, and the influence is not exerted extremely on only one of light passing through the base film 31 and corresponding to the right-eye light and light passing through the base film 31 and corresponding to the left-eye light. As a result, unbalance such as viewing severe ghosts by only the right eye or the left eye or a difference in colors of a picture between the right eye and the left eye is allowed to be reduced. Therefore, the retardation element 30 and the display 1 which are resistant to unbalance are achievable.

In particular, in an embodiment, in the case where the slow axis AX3 of the base film 31 is oriented in a direction parallel to the bisector in the vertical or horizontal direction of the slow axis AX1 and the slow axis AX2, the influence caused by the optical anisotropy of the base film 31 is uniformly exerted on each light passing through the base film 31. As a result, unbalance such as viewing severe ghosts by only the right eye or the left eye or a difference in colors of a picture between the right eye and the left eye is preventable. Therefore, the retardation element 30 and the display 1 which do not cause unbalance between right and left pictures are achievable.

Moreover, in an embodiment, in the case where as a base supporting the retardation layer 32 of the retardation element 30, a thin base film (for example, a resin film) is used, compared to the case where a glass plate is used as a supporting base of the retardation layer 32, the retardation element 30 is manufacturable at lower cost with good yield. Moreover, since the thin base film (for example, a resin film) is used as the supporting base of the retardation layer 32, a reduction in the profile of the display 1 is allowed.

Method of Manufacturing Retardation Element 30

An example of a method of manufacturing the retardation element 30 according to an embodiment will be described below. In this case, a plurality of groove regions are arranged on the retardation element 30, and a method in the case where a roll-shaped master is used to form the groove regions and a method in the case where a plate-shaped master is used to form the groove regions will be described separately.

Case where Roll-Shaped Master is Used

Figure 20:
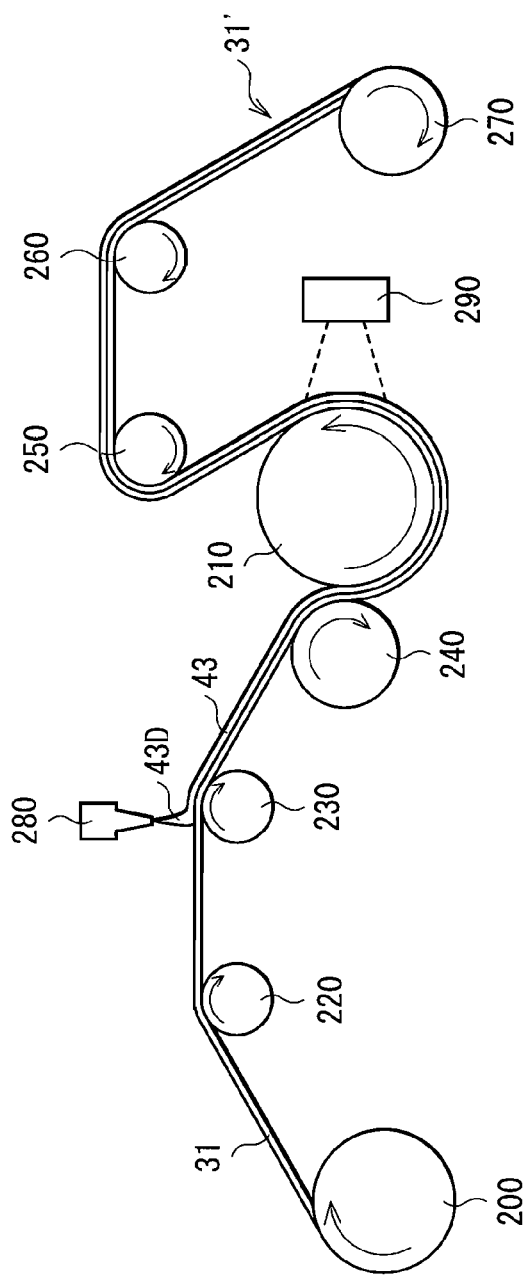
FIG. 20 is a schematic view illustrating an example of a configuration of a manufacturing apparatus used in an example of a method of manufacturing a retardation element according to an embodiment.

FIG. 20 illustrates an example of a configuration of a manufacturing apparatus for forming a plurality of minute grooves by the roll-shaped master. More specifically, first, the base film 31 is drawn out from a winding roll 200 is guided to a guide roll 230 via a guide roll 220, and then, for example, a discharging device 280 drops an UV curable resin liquid 43D (including, for example, an UV curable acrylic resin liquid) on the base film 31 to form an UV curable resin layer 43. Moreover, while a nip roll 240 presses the base film 31, the UV curable resin layer 43 on the base film 31 is pressed against a circumferential surface of a mold roll 210. In this case, reverse patterns of a plurality of minute grooves corresponding to the right-eye region 32A and the left-eye region 32B of the retardation element 30 are formed on the circumferential surface of the mold roll 210 in advance, and when the UV curable resin layer 43 is pressed against the circumferential surface of the mold roll 210 to transfer the patterns of the plurality of minute grooves to the UV curable resin layer 43.

In this case, unlike a photo-alignment film or a polyimide alignment film in related art, it is preferable that in a resin layer on the base film 31, light absorption or coloring hardly occurs. As the resin layer, as described above, for example, an acrylic UV curable resin may be used.

Moreover, for example, the opening width (pitch) of the plurality of minute grooves is preferably 2 μm or less (more preferably 1 μm or less). When the pitch is 2 μm or less, in a manufacturing step which will be described later, a material forming the retardation layer 32 (for example, a liquid crystal material which will be described later) is easily aligned on the plurality of minute grooves. Further, for example, the groove regions including a plurality of minute grooves are alternately arranged in stripes. For example, these stripe widths are preferably widths equivalent to a pixel pitch in the display 1.

Moreover, the extending direction of a plurality of minute grooves corresponding to the right-eye region 32A and the extending direction of a plurality of minute grooves corresponding to the left-eye region 32B are, for example, orthogonal to each other. Further, the extending directions of the plurality of minute grooves form an angle of −45° and +45° with respect to the stripe direction of the groove regions, respectively.

In this description, meanings of "parallel", "orthogonal", "vertical" and "the same direction" include "substantially parallel, "substantially orthogonal", "substantially vertical" and "substantially the same direction", respectively as far as the effects of the present invention are not adversely affected. For example, errors due to various factors such as manufacturing errors or variations are included.

After that, an ultraviolet ray is applied to the UV curable resin layer 43 from a ultraviolet irradiation device 290 to cure the UV curable resin layer 43. In this case, the ultraviolet irradiation device 290 applies an ultraviolet ray to a part having passed through the nip roll 240 and being in contact with the mold roll 210 of the base film 44 supplied from the winding roll 200. Next, the base film 31 is separated from the mold roll 112, and then the base film 31 is taken up by a take-up roll 270 via a guide roll 260. Thus, a base film 31' including the resin layer thereon is formed.

Figure 21:
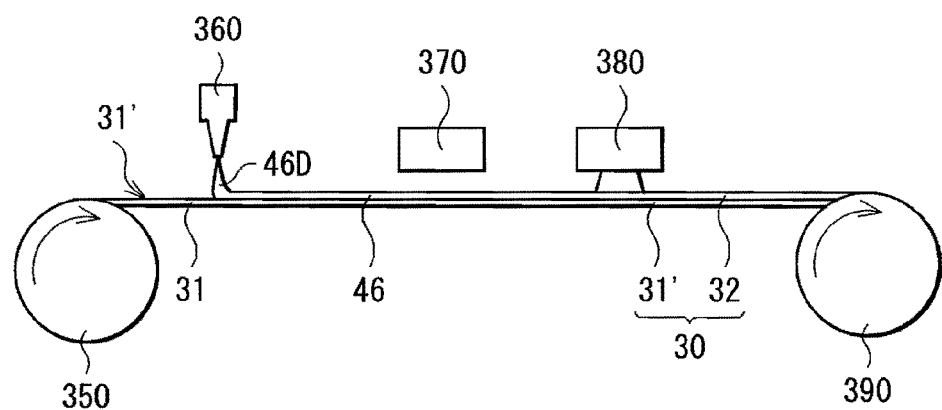
FIG. 21 is a schematic view illustrating an example of a configuration of a manufacturing apparatus used in a step following FIG. 20.

Next, a method of forming the retardation layer 32 will be described below. First, as illustrated in FIG. 21, the base film 31' is drawn out from a winding roll 350, and then a discharging device 360 drops a liquid crystal 46D including a liquid crystalline monomer on surfaces of a plurality of minute grooves to form a liquid crystal layer 46. Nest, a heater 370 is used to perform an alignment process (a heating process) on the liquid crystalline monomer of the liquid crystal layer 46 with which the surface of the base film 31' is coated, and then the liquid crystal layer 46 is slowly cooled to a slightly lower temperature than a phase transition temperature. Thereby, the liquid crystalline monomer is aligned according to the patterns of the plurality of minute grooves formed on the surface of the base film 31'.

Next, an ultraviolet irradiation device 380 applies UV light to the liquid crystal layer 46 subjected to the alignment process to polymerize the liquid crystalline monomer in the liquid crystal layer 46. In addition, at this time, a typical process temperature is often around room temperature, but the temperature may rise to a temperature equal to or lower than a phase transition temperature so as to adjust a retardation value. Thereby, the alignment state of liquid crystal molecules is fixed along the patterns of the plurality of minute grooves, thereby to form the retardation layer 32 (the right-eye region 32A and the left-eye region 32B).

In addition, for example, the thickness of the retardation layer 32 is preferably within a range of 0.1 μm to 10 μm. Moreover, the retardation layer 32 may include, for example, a polymerizable polymer liquid crystal material. As the polymer liquid crystal material, a material selected depending on a phase transition temperature (liquid crystal phase-isotropic phase), refractive index wavelength dispersion characteristics of the liquid crystal material, viscosity characteristics, process temperature or the like is used. However, the polymer liquid crystal material preferably includes an acryloyl group or a methacryloyl group as a polymerizable group in terms of transparency. Moreover, a material not including a methylene spacer between a polymerizable functional group and a liquid crystal skeleton is preferably used, because an alignment process temperature during the process is allowed to be reduced.

In addition, the retardation layer 32 may be made of only a polymerized polymer liquid crystal material, or may include an unpolymerized liquid crystalline monomer as described above. In the case where the unpolymerized liquid crystalline monomer is included, depending on the alignment process (the heating process), the unpolymerized liquid crystalline monomer is aligned in the same direction as the alignment direction of liquid crystal molecules around the liquid crystalline monomer, and has the same alignment characteristics as those of the polymer liquid crystal material.

Thus, the retardation element 30 is completed. After that, the retardation element 30 is taken up by a take-up roll 390.

Although not illustrated, in the above-described manufacturing step, the reverse pattern of the master may be directly transferred to the base film 31 without arranging the UV curable resin layer 43 to complete a base film on which a plurality of minute grooves are formed. In this case, the retardation element 30 may be formed by the above-described manufacturing method, except that a step of forming the above-described UV curable resin layer 43 is removed.

Moreover, although not illustrated, the base film 31 and the UV curable resin layer 43 may be arranged so as to be in direct contact with each other, or another layer may be arranged between the base film 31 and the UV curable resin layer 43. As another layer, an anchor layer or the like for improving adhesion between the base film 13 and the UV curable resin layer 43 is used.

Further, although not illustrated, an unaligned thin film for improving alignment of a predetermined material (for example, the above-described liquid crystal material) may be separately arranged between the UV curable resin layer 43 (in the case where the resin layer 43 is not arranged, the base film 31) and the retardation layer 32. Thereby, compared to the case where the liquid crystal layer 46 is formed directly on surfaces of the plurality of minute grooves, a possibility that an influence of molecule alignment on the surfaces of the plurality of minute grooves is exerted on the liquid crystal layer 46 is allowed to be reduced. As a result, even if molecules on the surfaces of the plurality of minute grooves are aligned in a direction different from the extending direction of the minute grooves, the liquid crystal layer 46 (the retardation layer 32) is allowed to be aligned along the extending direction of a depression formed by the unaligned thin film. In other words, the liquid crystal layer 46 (the retardation layer 32) is allowed to be aligned in a desired direction.

As a method of forming the unaligned thin film, for example, an UV curable resin layer is arranged on the surfaces of the plurality of minute grooves. The UV curable resin layer may be the same as or different from the UV curable resin layer forming the above-described resin layer. Next, UV light is applied to the UV curable resin layer to cure the UV curable resin layer. Thereby, the unaligned thin film is formed along the surfaces of the plurality of minute grooves. The unaligned thin film may be formed by an apparatus with a configuration connected to the manufacturing apparatus illustrated in FIG. 20.

In the embodiment, unlike the case where liquid crystal molecules are aligned by an alignment film as in related art, a heating process at high temperature is not necessary, so a base film (for example, a resin film) which is more easily processed and less expensive than a glass material or the like may be used.

Case where a Plate-Shaped Master is Used

Figure 22A:
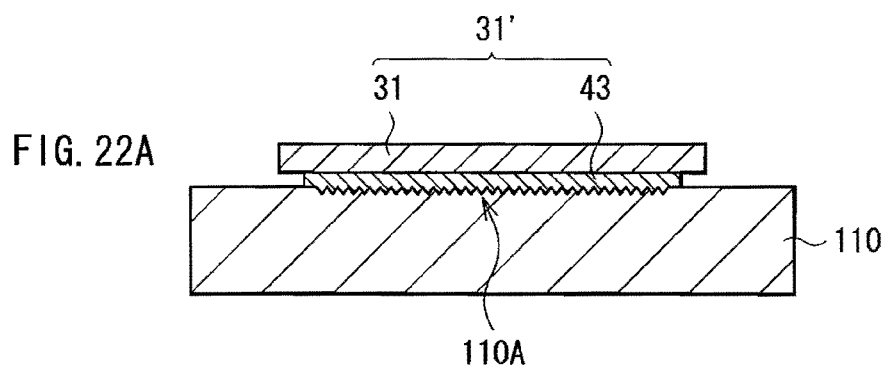
FIGS. 22A and 22B are schematic views for describing another example of the method of manufacturing the retardation element according to an embodiment.
Figure 22B:
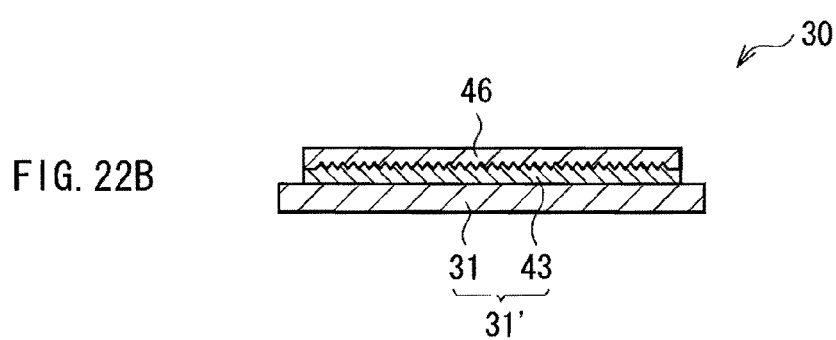

Next, referring to FIGS. 22A and 22B, a method of forming the retardation element 30 in the case where the plate-shaped master is used will be described below. First, the base film 31 is prepared. Then, for example, the UV curable resin layer 43 (for example, an acrylic resin) is arranged on a surface of a plate-shaped master 110 on which reverse patterns of a plurality of minute grooves corresponding to the right-eye region and the left-eye region of the retardation element 30 are formed, and then the UV curable resin layer 43 is sealed with the base film 31. Next, UV light is applied to the UV curable resin layer 43 to cure the UV curable resin layer 43, and then the master 110 is removed. Thereby, the base film 31' including the resin layer thereon is formed (refer to FIG. 22A).

Next, a method of forming the retardation layer 32 will be described below (refer to FIG. 22B). First, the liquid crystal layer 46 including a liquid crystalline monomer is formed on surfaces of the plurality of minute grooves by coating with, for example, a roll coater. At this time, in the liquid crystal layer 32, if necessary, a solvent, a polymerization initiator, a polymerization inhibitor, a surface-active agent, a leveling agent or the like for dissolving the liquid crystalline monomer may be used. The solvent is not specifically limited, but as the solvent, a solvent having a high property of dissolving the liquid crystalline monomer, a low vapor pressure at room temperature and resistance to evaporation at room temperature is preferably used. Examples of a solvent having resistance to evaporation at room temperature include 1-methoxy-2-acetoxypropane (PGMEA), toluene, methyl ethyl ketone (MEK), methyl isobutyl ketone (MIBK) and the like, because when a solvent which is easily evaporated at room temperature is used, the evaporation rate of the solvent after forming the liquid crystal layer 46 by coating is too fast, thereby the liquid crystalline monomer formed after the evaporation of the solvent is easily misaligned.

Next, an alignment process (a heating process) on the liquid crystalline monomer of the liquid crystal layer 46 is performed. The heating process is performed at a temperature equal to or higher than the phase transition temperature of the liquid crystalline monomer, and in particular, in the case where the solvent is used, at a temperature equal to or higher than a temperature at which the solvent is dried. In this case, by coating with the liquid crystalline monomer in a previous step, a shear stress is generated at an interface between the liquid crystalline monomer and the minute grooves to cause alignment by a flow (flow-induced alignment) or alignment by a force (external force-induced alignment), thereby the liquid crystal molecules may be aligned in an unintended direction. The above-described heating process is performed to cancel the alignment state of the liquid crystalline monomer which is aligned in an unintended direction. Thereby, in the liquid crystal layer 46, the solvent is dried so that only the liquid crystalline monomer remains, thereby the state of the liquid crystal layer 46 is in an isotropic phase.

Next, the liquid crystal layer 46 is slowly cooled to a slightly lower temperature than a phase transition temperature. Thereby, the liquid crystalline monomer is aligned according to the patterns of the plurality of minute grooves.

Then, for example, UV light is applied to the liquid crystal layer 46 subjected to the alignment process to polymerize the liquid crystalline monomer. In addition, at this time, a typical process temperature is often around room temperature, but the process temperature may rise to a temperature equal to or lower than the phase transition temperature so as to adjust a retardation value. Thereby, the alignment state of liquid crystal molecules is fixed along the patterns of the plurality of minute grooves so as to form the right-eye region 32A and the left-eye region 32B. Thus, the retardation element 30 is completed (refer to FIG. 22B).

In addition, as in the case where the roll-shaped master is used, the reverse pattern of the master may be directly transferred to the base film 31 without arranging the UV curable resin layer 43 to complete a base film on which a plurality of minute grooves are formed. Moreover, the above-described anchor layer or the above described unaligned thin film may be formed.

In the embodiment, unlike the case where liquid crystal molecules are aligned by an alignment film as in related art, a heating process at high temperature is not necessary, so a base film (for example, a resin film) which is more easily processed and less expensive than a glass material or the like may be used.

Modifications

Figure 12:
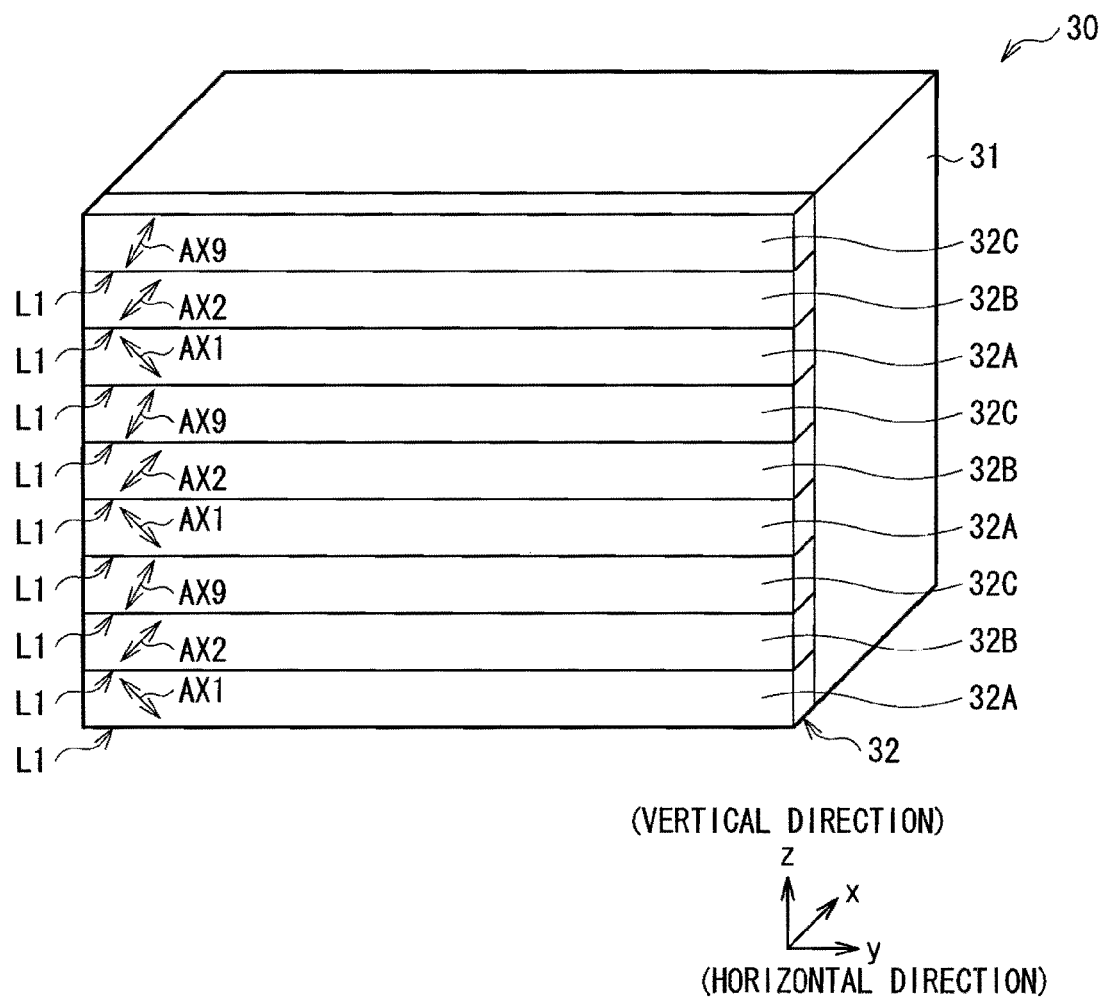
FIG. 12 is a configuration diagram illustrating another example of the retardation element in FIG. 1.

In the above-described embodiment, in the retardation element 30, retardation regions of two kinds (the right-eye regions 32A and the left-eye regions 32B) of which the slow axes are oriented in different directions from each other are included, but retardation regions of three or more kinds of which the slow axes are oriented in different directions from one another may be included. For example, as illustrated in FIG. 12, in addition to the right-eye regions 32A and the left-eye regions 32B, third regions 32C having a slow axis AX9 in a direction different from the directions of the slow axes AX1 and AX2 of the right-eye regions 32A and the left-eye regions 32B may be included in the retardation element 30.

Figure 13:
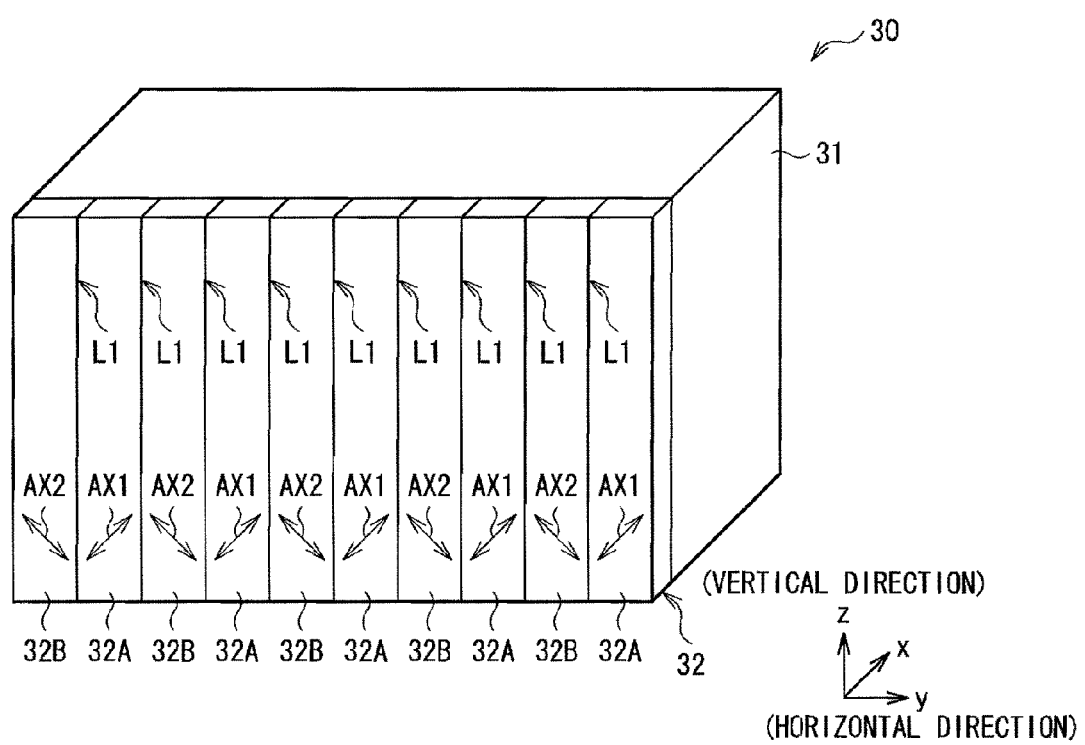
FIG. 13 is a configuration diagram illustrating still another example of the retardation element in FIG. 1.

Moreover, in the above-described embodiment, the case where the retardation regions (the right-eye regions 32A and the left-eye regions 32B) of the retardation element 30 extend in the horizontal direction is exemplified, but the retardation regions may extend in any other direction. For example, as illustrated in FIG. 13, the retardation regions (the right-eye regions 32A and the left-eye regions 32B) of the retardation element 30 may extend in the vertical direction.

Figure 14:
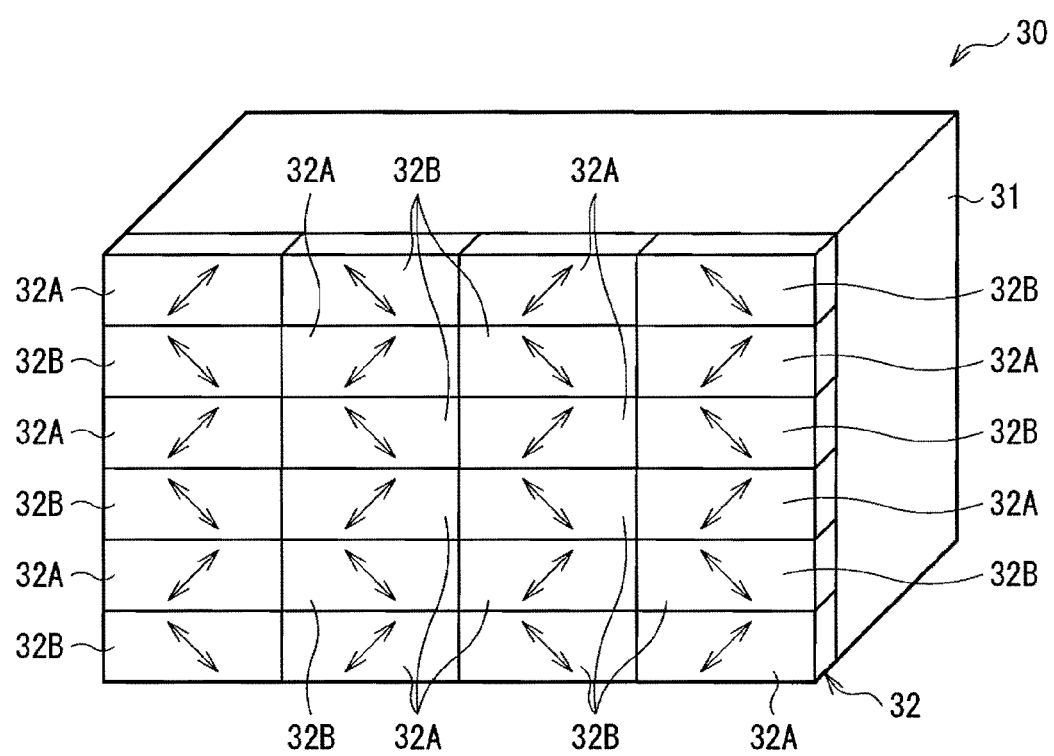
FIG. 14 is a configuration diagram illustrating a further example of the retardation element in FIG. 1.

Further, in the above-described embodiment and the above-described modifications, the case where all of the retardation regions (the right-eye regions 32A and the left-eye regions 32B) of the retardation element 30 extend in the horizontal direction or the vertical direction of the retardation element 30 is exemplified, but, for example, as illustrated in FIG. 14, the retardation regions may be two-dimensionally arranged in the horizontal direction and the vertical direction. In addition, even if the retardation regions are two-dimensionally arranged, a boundary line between retardation regions is defined as a boundary line in a vertical direction.

Moreover, in the above-described embodiment and the above-described modifications, the case where the retardation element 30 is applied to the display 1 is exemplified, but the retardation element 30 is applicable to any other devices.

Figure 15:
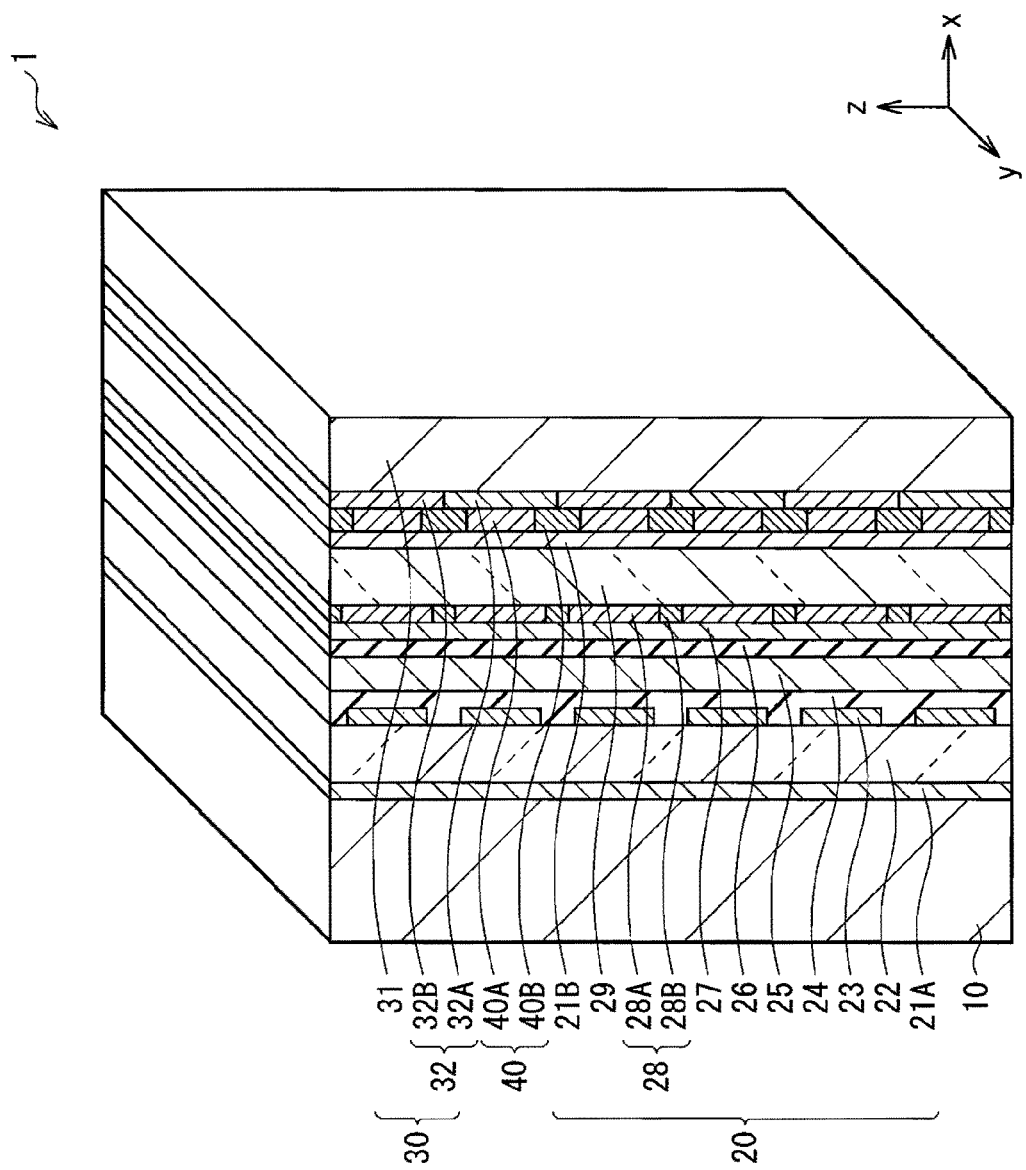
FIG. 15 is a configuration diagram illustrating another example of the display in FIG. 1.

Further, in the above-described embodiment and the above-described modifications, an element which controls the divergence angle of light outputted from the liquid crystal display panel 20 is not arranged, but, for example, as illustrated in FIG. 15, a black stripe layer 40 may be arranged between the liquid crystal display panel 20 and the retardation element 30. The black stripe layer 40 includes a transmission section 40A arranged in a region facing the pixel electrode 23 in the liquid crystal display panel 20 and a light-shielding section 40B arranged around the transmission section 40A. Thereby, in the case where the viewer views the image display surface from obliquely above or obliquely below, such an issue called crosstalk that light having passed through a left-eye pixel or a right-eye pixel enters into the right-eye region 32A or the left-eye region 32B is preventable.

Figure 16:
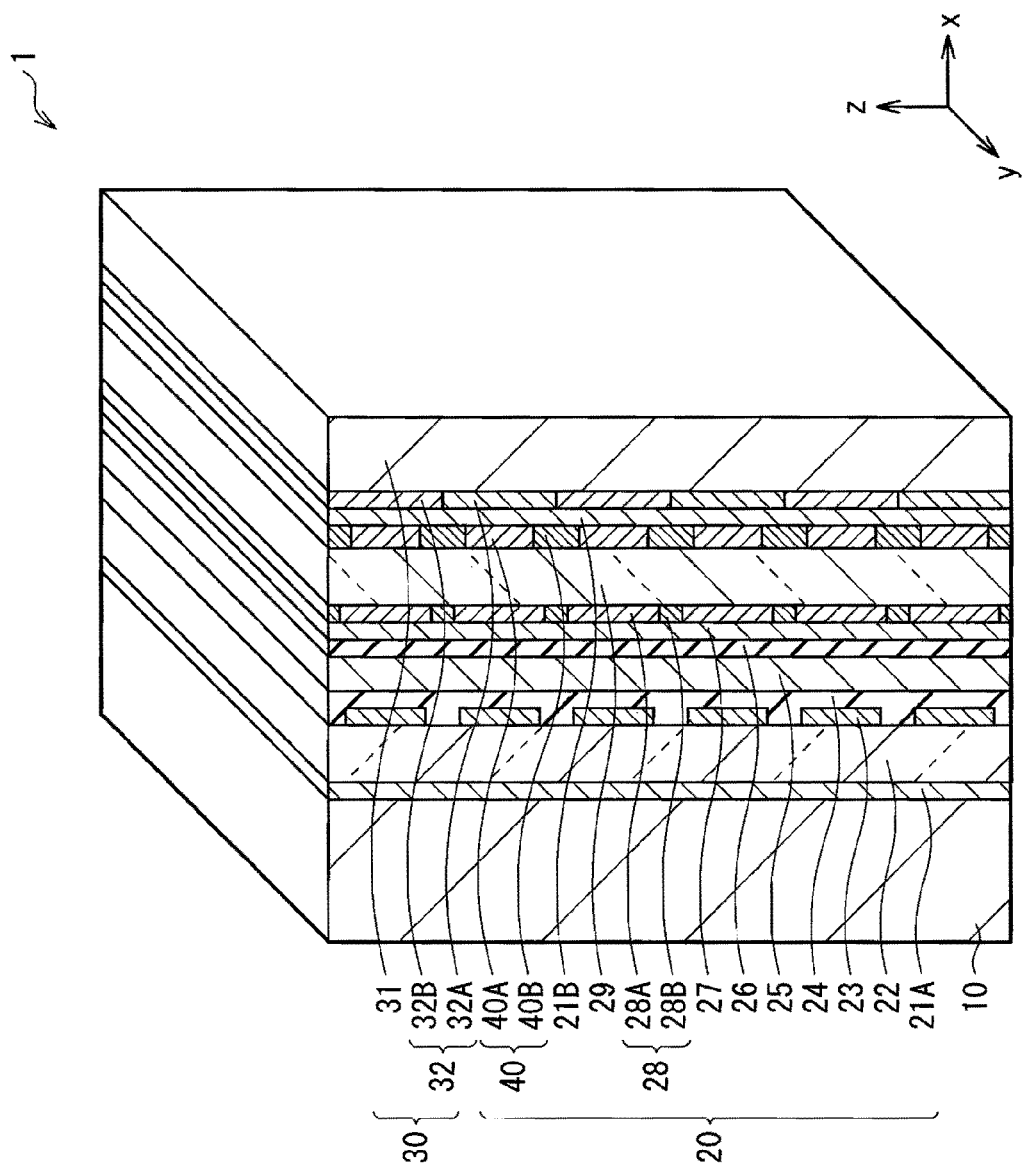
FIG. 16 is a configuration diagram illustrating still another example of the display in FIG. 1.

In addition, the black stripe layer 40 is not necessarily arranged between the liquid crystal display panel 20 and the retardation element 30, and, for example, as illustrated in FIG. 16, the black stripe layer 40 may be arranged between the polarizing plate 21B and the transparent substrate 29 in the liquid crystal display panel 20.

The case where the pair of polarized glasses 2 are of circular polarization type, and the display 1 is a display for circularly polarized glasses is described above, but the present invention is applicable to the case where the pair of polarized glasses 2 is of a linear polarization type, and the display 1 is a display for linearly polarized glasses.

Examples

Examples 1 and 2 of the display 1 according to the embodiment will be described below.

As Example 1, a display in which the slow axis AX3 of the base film 31 was oriented in a direction perpendicular to the boundary line L1 was used (refer to FIGS. 3A and 3B), and as Example 2, a display in which the slow axis AX3 of the base film 31 was oriented in a direction parallel to the boundary line L1 was used (refer to FIGS. 4A and 4B). In other words, in Examples 1 and 2, the slow axis AX3 intersected with the slow axes AX1 and AX2, and was oriented in substantially the same direction as the direction of the bisector in the vertical or horizontal direction of the slow axes AX1 and AX2.

First, extinction ratios of Examples 1 and 2 were calculated and evaluated. The extinction ratios were determined by the above-described formulas (1) and (2).

As illustrated in FIGS. 2A and 2B, the transmission axes AX7 and AX8 of the polarization plates 41A and 42A in the pair of polarized glasses 2 were preferably arranged in crossed Nicols in relation to the transmission axis AX4 of the polarizing plate 21B on an emission side of the display 1, so the transmission axis AX4 of the polarizing plate 21B on an emission side was oriented in the vertical direction, and the transmission axes AX7 and AX8 were oriented in the horizontal direction (refer to FIG. 2A). Moreover, the retardations of the right-eye region 32 and the left-eye region 32B of the retardation layer 32 were substantially X14. The slow axis AX2 of the left-eye region 32B and the slow axis AX6 of the left-eye retardation film 42B were oriented in the same direction, and the slow axis AX1 of the right-eye region 32A and the slow axis AX5 of the right-eye retardation film 41B were oriented in the same direction. In such an arrangement, the extinction ratios of the right-eye region 32A and the left-eye region 32B were calculated by an extended Jones matrix method.

In addition, the retardations of the right-eye and left-eye retardation films 41B and 42B of the pair of polarized glasses 2 and the right-eye region 32A and the left-eye region 32B of the retardation element 30 are preferably λ/4 or equivalent to λ/4 at all wavelengths, but in materials commercially used at present, retardation wavelength dispersion occurs. Herein, as the retardation films 41B and 42B of the pair of polarized glasses 2, polycarbonate was used, and as the materials of the right-eye region 32A and the left-eye region 32B, a liquid crystal polymer was used.

Figure 17:
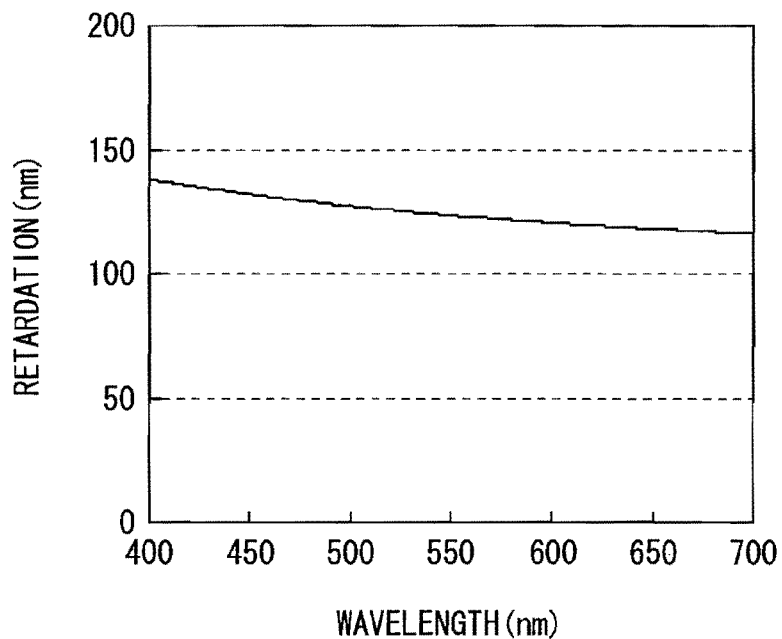
FIG. 17 is a plot illustrating the retardation of a retardation film in a pair of polarized glasses.
Figure 18:
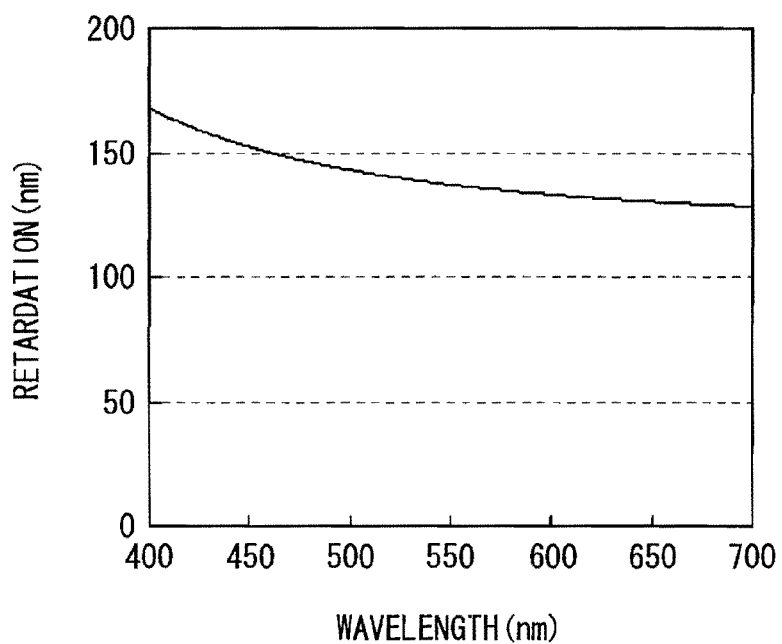
FIG. 18 is a plot illustrating retardations of a right-eye region and a left-eye region.
Figure 19:
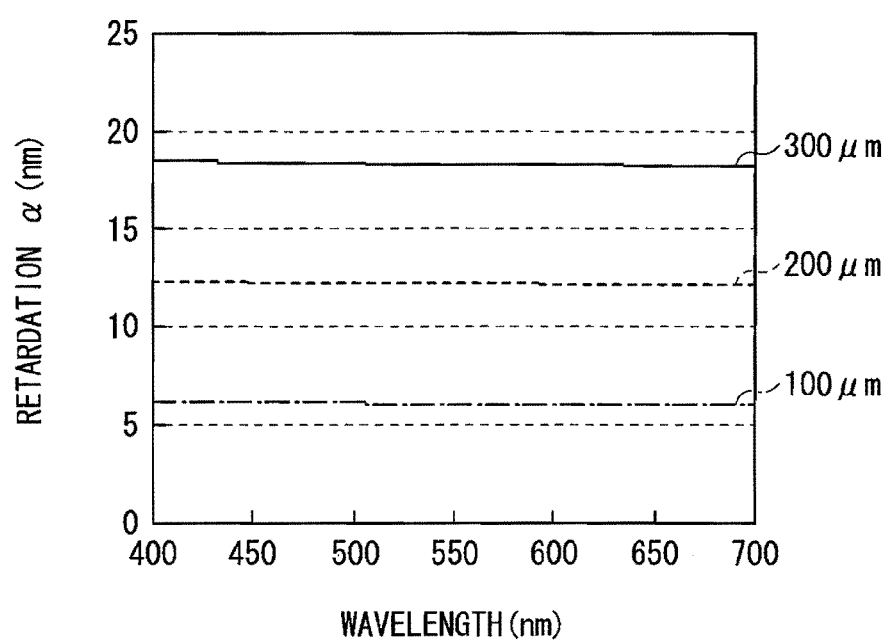
FIG. 19 is a plot illustrating the retardation of the base film.

The retardations of the retardation films 41B and 42B of the pair of polarized glasses 2 were equal to each other, and both of the retardation films 41B and 42B had a retardation value illustrated in FIG. 17. Moreover, the retardations of the right-eye region 32A and the left-eye region 32B were also equal to each other, and both of the right-eye region 32A and the left-eye region 32B had a retardation value illustrated in FIG. 18. On the other hand, the base film 31 of the retardation element 30 preferably has such isotropy that the retardation is 0, but as long as the base film 31 is configured of a film actually commercially available, the base film 31 has a retardation to some extent. In this case, as the base film 31, Zeonor (a registered trademark of Zeon Corporation) films with a thickness of 100 μm, 200 μm and 300 μm were used, and the films had a retardation value illustrated in FIG. 19. In other words, in a visible region, the retardation of the film with a thickness of 100 μm was approximately 6 nm, the retardation of the film with a thickness of 200 μm was approximately 12 nm, and the retardation of the film with a thickness of 300 μm was approximately 18 nm.

Results of calculating the extinction ratios are illustrated in FIGS. 10A, 10B, 11A and 11B. In addition, similar results were obtained in Examples 1 and 2, so only the results of Example 1 are illustrated in FIGS. 10A, 10B, 11A and 11B. It was confirmed from the drawings that in both of the right-eye region 32A and the left-eye region 32B, the smaller the thickness of the base film 31 was, the larger the angles θ1 and θ2 at which the extinction ratios β1 and β2 were optimized (maximized) became. In other words, it was confirmed that the larger the retardation α of the base film 31 was, the larger the offsets from 45° of the angles θ1 and θ2 at which the extinction ratios β1 and β2 were optimized (maximized) became. Moreover, it was confirmed that the smaller the value of the retardation α was, the more the values of the extinction ratio β1 and β2 were allowed to increase. However, when the angles θ1 and θ2 were larger than 52°, the peak values of the extinction ratios were reduced to values substantially equal to the values of the extinction ratios when the absolute values of the angles θ1 and θ2 were 45° and the retardation α was 6 nm. Therefore, it was confirmed that the angle θ1 was preferably larger than +45° and equal to or smaller than +52°, and the angle θ2 was preferably smaller than −45° and equal to or larger than −52°. That is, it was confirmed that the absolute values of θ1 and /or θ2 are preferably larger than 45° and equal to or smaller than 52°.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The invention claimed is:

1. A retardation element comprising:
a base film having optical anisotropy and a slow axis in an in-plane direction of the base film; and
a retardation layer formed on the base film and having optical anisotropy,
wherein the retardation layer includes retardation regions of two or more kinds of which slow axes are in the in-plane direction of the base film and oriented in different directions from one another,
wherein the retardation regions of two or more kinds are arranged regularly adjacent to one another in the in-plane direction of the base film, and
wherein each of the retardation regions has a slow axis in a direction intersecting with the slow axis of the base film at an angle larger than 45° and equal to or smaller than 52°.

2. The retardation element according to claim 1, wherein the slow axis of each of the retardation regions is oriented in a direction intersecting with the slow axis of the base film at an angle corresponding to the magnitude of retardation of the base film.

3. The retardation element according to claim 1, wherein the retardation regions of two or more kinds comprises a right-eye region and a left-eye region, and wherein the slow axis of each of the retardation regions is oriented in a direction intersecting with the slow axis of the base film at an angle corresponding to one or both of peak values of extinction ratios represented by the following two formulas:

$$\text{Extinction Ratio of Right-}EyeRegion = \frac{\text{Luminance When Right-}EyeRegion \text{ is Viewed With Right-}EyeLens}{\text{Luminance When Right-}EyeRegion \text{ is Viewed With Left-}EyeLens} \quad \text{Mathematical Formula 1}$$

$$\text{Extinction Ratio of Left-}EyeRegion = \frac{\text{Luminance When Left-}EyeRegion \text{ is Viewed With Left-}EyeLens}{\text{Luminance When Left-}EyeRegion \text{ is Viewed With Right-}EyeLens} \quad \text{Mathematical Formula 2}$$

wherein the luminance in each ratio is calculated when a pair of polarized glasses comprising a right-eye lens and a left-eye lens are used.

4. The retardation element according to claim 1, wherein the base film is configured of a resin film.

5. The retardation element according to claim 1, wherein the base film has a slow axis in a direction parallel to or orthogonal to a boundary line of adjacent retardation regions.

6. The retardation element according to claim 1, wherein the retardation regions of one kind each have a retardation of +λ/4, and the retardation regions of other kinds each have a retardation of −λ/4.

7. The retardation element according to claim 1, wherein the retardation layer includes the retardation regions of two kinds, each of the retardation regions has a slow axis in such a direction that a bisector of the slow axes of the retardation region of one kind and the retardation region of the other kind are parallel to the slow axis of the base film.

8. A display comprising:
a display panel being driven in response to an image signal;
a backlight unit applying light to the display panel; and a retardation element arranged on a side opposite to a side where the backlight unit is arranged of the display panel,
wherein the retardation element includes:
a base film having optical anisotropy and a slow axis in an in-plane direction of the base film, and
a retardation layer formed on the base film and having optical anisotropy,
wherein the retardation layer includes retardation regions of two or more kinds of which slow axes are in the in-plane direction of the base film and oriented in different directions from one another,
wherein the retardation regions of two or more kinds are arranged regularly adjacent to one another in the in-plane direction of the base film, and
wherein each of the retardation regions has a slow axis in a direction intersecting with the slow axis of the base film at an angle larger than 45° and equal to or smaller than 52°.

9. A retardation element comprising:
a base film having optical anisotropy; and
a retardation layer formed on the base film and having optical anisotropy,
wherein the retardation layer includes retardation regions of two or more kinds of which slow axes are oriented in different directions from one another,
the retardation regions of two or more kinds are arranged regularly adjacent to one another in an in-plane direction of the base film, and
each of the retardation regions has a slow axis in a direction intersecting with a slow axis of the base film at an angle of larger than 45° and equal to or smaller than 52°.

10. A display comprising:
a display panel being driven in response to an image signal;
a backlight unit applying light to the display panel; and
a retardation element arranged on a side opposite to a side where the backlight unit is arranged of the display panel,
wherein the retardation element includes:
a base film having optical anisotropy, and
a retardation layer formed on the base film and having optical anisotropy, and
the retardation layer includes retardation regions of two or more kinds of which slow axes are oriented in different directions from one another,
the retardation regions of two or more kinds are arranged regularly adjacent to one another in an in-plane direction of the base film, and
each of the retardation regions has a slow axis in a direction intersecting with a slow axis of the base film at an angle of larger than 45° and equal to or smaller than 52°.

* * * * *